(12) United States Patent
Sison et al.

(10) Patent No.: US 12,484,852 B2
(45) Date of Patent: Dec. 2, 2025

(54) METHODS AND DEVICES RELATED TO OPERATION OF AN IMPLANTABLE MEDICAL DEVICE DURING MAGNETIC RESONANCE IMAGING

(71) Applicant: Pacesetter, Inc., Sylmar, CA (US)

(72) Inventors: Shiloh Sison, Alameda, CA (US); Yash Vardhan Tiwari, Valencia, CA (US); Xi Lin Chen, Stevenson Ranch, CA (US); Xiyao Xin, North Ridge, CA (US)

(73) Assignee: Pacesetter, Inc., Sylmar (CA)

( * ) Notice: Subject to any disclaimer, the term of this patent is extended or adjusted under 35 U.S.C. 154(b) by 891 days.

(21) Appl. No.: 17/669,968

(22) Filed: Feb. 11, 2022

(65) Prior Publication Data

US 2022/0338809 A1    Oct. 27, 2022

Related U.S. Application Data

(60) Provisional application No. 63/180,123, filed on Apr. 27, 2021.

(51) Int. Cl.
*A61B 5/00* (2006.01)
*A61B 5/024* (2006.01)
(Continued)

(52) U.S. Cl.
CPC .......... *A61B 5/686* (2013.01); *A61B 5/02416* (2013.01); *A61B 5/055* (2013.01);
(Continued)

(58) Field of Classification Search
None
See application file for complete search history.

(56) References Cited

U.S. PATENT DOCUMENTS 8,620,446 B2   12/2013  Min et al.
9,549,688 B2    1/2017  Zeijlemaker
(Continued)

*Primary Examiner* — Jason M Sims
*Assistant Examiner* — Matthew Eric Ogles
(74) *Attorney, Agent, or Firm* — Dean D. Small; The Small Patent Law Group, LLC

(57) ABSTRACT

An implantable medical device (IMD) is provided and includes sensing circuitry coupled to electrodes. The sensing circuitry is configured to sense electrical biological signals indicative of a non-physiologic condition of interest experienced by a patient during a magnetic resonance imaging (MRI) procedure, and in the presence of an MRI scanning sequence, the MRI scanning sequence includes at least one of radio frequency (RF) or gradient fields that are in an active state for active field intervals. The device includes memory to store the biological signals and to store program instructions and includes a processor that, when executing the program instructions, is configured to: determine start times for the active field intervals when the at least one of RF or gradient fields switch to the active state and manage generation of MRI-induced-noise corrected (MRI-INC) biological signals, based on the start times for the active field intervals, by at least one of: 1) applying a blanking interval to the sensing circuitry to blank a sensing operation during at least portions of the active field interval or 2) modifying segments of the biological signal sensed during at least the portions of the active field interval, and 3) comparing biologic signal sensed during at least the portions of the active field interval to a template. The device analyzes the biological signals for an indication that the patient is experiencing the non-physiologic condition.

15 Claims, 15 Drawing Sheets

(51) Int. Cl.
*A61B 5/055* (2006.01)
*A61B 5/07* (2006.01)

(52) U.S. Cl.
CPC ............ *A61B 5/076* (2013.01); *A61B 5/7203* (2013.01); *A61B 5/7282* (2013.01); *A61B 5/7285* (2013.01); *A61B 2560/0266* (2013.01)

(56) References Cited

U.S. PATENT DOCUMENTS

| | | |
|---|---|---|
| 10,279,186 B2 | 5/2019 | Gadagkar et al. |
| 2005/0070787 A1* | 3/2005 | Zeijlemaker ............ A61B 5/055 128/903 |
| 2010/0106214 A1* | 4/2010 | Min ........................ A61N 1/056 607/116 |
| 2012/0226140 A1* | 9/2012 | Min ..................... A61B 5/7203 600/411 |
| 2017/0366921 A1* | 12/2017 | Pflugh .................... A61B 5/361 |
| 2018/0344198 A1 | 12/2018 | Gebhardt et al. |

* cited by examiner

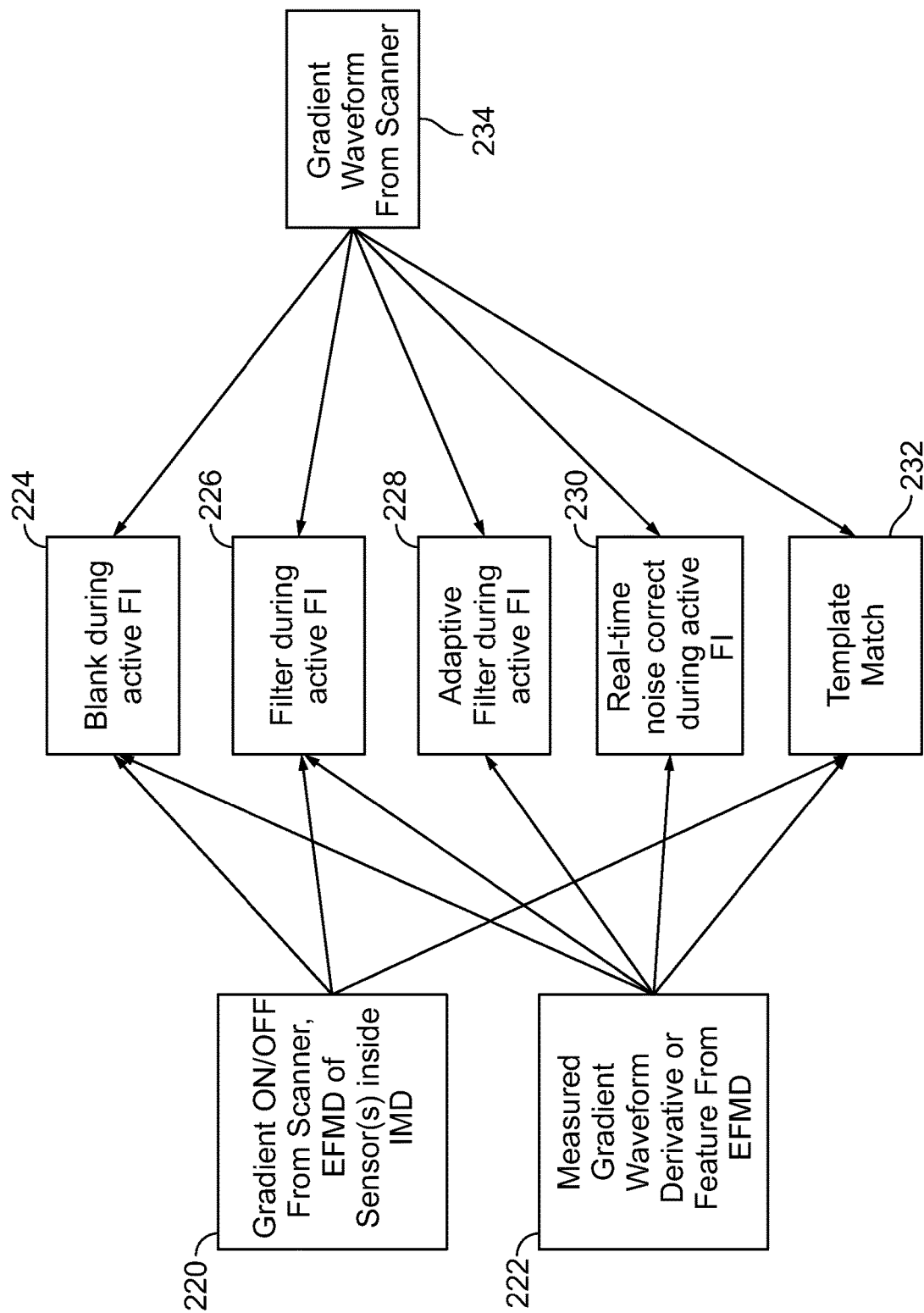

METHODS AND DEVICES RELATED TO OPERATION OF AN IMPLANTABLE MEDICAL DEVICE DURING MAGNETIC RESONANCE IMAGING

RELATED APPLICATION DATA

The present application claims priority to U.S. Provisional Application No. 63/180,123, titled "METHODS AND DEVICES RELATED TO OPERATION OF AN IMPLANTABLE MEDICAL DEVICE DURING MAGNETIC RESONANCE IMAGING," filed Apr. 27, 2021, the complete subject matter of which is expressly incorporated herein by reference in its entirety.

The present application relates to application (Ser. No. 17/670,005) Titled "SYSTEM FOR DETECTING MAGNETIC RESONANCE GENERATED GRADIENT FIELD USING AN IMPLANTABLE MEDICAL DEVICE" filed on Feb. 11, 2022, the complete subject matter of which is expressly incorporated herein by reference in its entirety.

BACKGROUND

Embodiments of the present disclosure generally concern methods and devices related to operating an implantable medical device during a magnetic resonance imaging (MRI) procedure.

Magnetic resonance imaging (MRI) is an effective, non-invasive imaging technique for generating sharp images of the internal anatomy of the human body, which provides an efficient means for diagnosing disorders such as neurological and cardiac abnormalities and for spotting tumors and the like. Briefly, the patient is placed within the center of a large superconducting magnet that generates a powerful static magnetic field. The static magnetic field causes protons within tissues of the body to align with an axis of the static field. A pulsed radio-frequency (RF) magnetic field is then applied causing precession of the protons around the axis of the static field. Pulsed gradient magnetic fields are then applied to cause the protons within selected locations of the body to emit RF signals, which are detected by sensors of the MRI system. Based on the RF signals emitted by the protons, the MRI system then generates a precise image of the selected locations of the body, typically image slices of organs of interest.

A significant problem with MRI is that its strong magnetic fields can interfere with the operation of implantable medical devices (IMDs), such as a pacemaker, cardiac resynchronization therapy (CRT) device, implantable cardioverter defibrillator (ICD) device, neurostimulation (NS) device, implantable cardiac monitor (ICM), leadless IMD and other electronic devices implanted within the patient. Typically, IMDs, that delivery therapy, include pulse generators for generating electrical pacing pulses and shocking circuits for generating stronger defibrillation shocks. The IMD may include one or more electrodes located on the housing of the device and/or include one or more electrodes located on a lead that is coupled to a header of the IMD. The IMD and/or lead may be configured to be implanted subcutaneous, transvenous proximate the spine, within the skull and the like. IMDs are configured to collect various types of biological signals, analyze the biological signals for various non-physiologic conditions, communicate the biological signals and/or non-physiologic condition to an external device, and/or deliver therapy. The therapy may include delivering pacing pulse, delivering defibrillation shocks, delivering neurostimulation pulses, releasing a drug, transmitting a notification and the like.

The leads, and/or the IMD itself, may also have a variety of sensors for sensing physiological signals within the heart of the patient, such as electrical sensors, pressure temperature sensor, sensors, $SvO_2$ sensors, photoplethysmography (PPG) and the like. The sensors are typically connected to the implantable device via electrical signal conduction paths within the various leads so as to receive control signals from the implanted device and to relay sensed signals back to the device.

When patients with pacers or ICDs are exposed to MRI fields, RF fields of the MRI can induce currents along the conduction paths. The MRI system can induce currents among the conduction paths sufficient to trigger unwanted pacing pulses or even defibrillation shocks. These induced currents are referred to as parasitic currents. Pacing pulses induced by the MRI could, in certain cases, cause a life-threatening fibrillation of the heart. Likewise, any defibrillation shocks triggered by the presence of the MRI fields can also induce fibrillation, particularly if the shock is delivered during a repolarization period of the ventricular myocardium. Another significant concern is that the induced voltages can be mistakenly sensed by the pacemaker as intrinsic heartbeats. In some pacing modes, particularly demand-based modes, the pacemaker then assumes that the heart needs no pacing assistance and will block its pacing output (i.e. delivery of a pacing pulse is inhibited.) This could cause a "pacing dependent" patient to pass out and possibly die. Another concern is that the MRI induced noise can mask a true arrythmia which could prevent the device from delivering needed defibrillation therapy.

In view of these concerns, with many conventional IMDs, certain types of therapies (e.g. high-voltage (HV) therapy) are disabled during the MRI scan due to interference signals generated by the MRI scanner. Consequently, a healthcare provider was needed to monitor the patient during the scan while the patient's IMD was disabled.

Further, various safeguard techniques have been developed that operate to detect the strong fields associated with an MRI and then switch sensing modes or pacing modes in response thereto. See, for example, U.S. Patent Application 2003/0083570 to Cho et al.; U.S. Patent Application 2003/0144704 to Terry et al.; U.S. Patent Application 2003/0144705 to Funke; U.S. Patent Application 2003/0144706 also to Funke; U.S. Pat. No. 6,795,730 to Connelly et al., and U.S. Patent Application 2004/0088012 of Kroll et al.

However, it would be preferable to allow the implanted device to continue to operate in its normal pacing and sensing modes even during an MRI procedure, so long as arrhythmias are not induced, unnecessary pacing pulses or shocks are not delivered, and any necessary therapy is not improperly inhibited. With conventional implantable systems, though, the strong MRI fields can prevent the implanted device from reliably sensing signals from the various electrodes of the leads and from the various physiological sensors, thus preventing the implanted device from reliably detecting arrhythmias or other abnormal conditions within the patient during the MRI procedure.

Accordingly, there is a need to provide improved implantable components configured to allow the implanted device to continue to reliably receive signals from sensing leads and physiological sensors during an MRI. Among other things, a need remains for methods and systems that enable the IMD to identify and differentiate MRI induced noise signals from the physiologic signals, to enable sensing and HV therapy to be delivered if necessary during the MRI scan.

SUMMARY

In accordance with embodiments herein, an implantable medical device (IMD) is provided and includes sensing circuitry coupled to electrodes. The sensing circuitry is configured to sense electrical biological signals indicative of a non-physiologic condition of interest experienced by a patient during a magnetic resonance imaging (MRI) procedure, and in the presence of an MRI scanning sequence, the MRI scanning sequence includes at least one of radio frequency (RF) or gradient fields that are in an active state for active field intervals. The device includes memory to store the biological signals and to store program instructions and includes a processor that, when executing the program instructions, is configured to: determine start times for the active field intervals when the at least one of RF or gradient fields switch to the active state and manage generation of MRI-induced-noise corrected (MRI-INC) biological signals, based on the start times for the active field intervals, by at least one of: 1) applying a blanking interval to the sensing circuitry to blank a sensing operation during at least portions of the active field interval or 2) modifying segments of the biological signal sensed during at least the portions of the active field interval, and 3) comparing biologic signal sensed during at least the portions of the active field interval to a template. The device analyzes the biological signals for an indication that the patient is experiencing the non-physiologic condition.

Optionally, The IMD may further comprise a transceiver configured to transmit at least one of the MRI-INC biological signals or the biological signals with MRI induced noise therein. When the analysis determines a presence of the non-physiologic condition, the IMD may further comprise a transceiver configured to transmit an instruction to the MRI scanner to halt the MRI scanning sequence. The processor may be further configured to determine when the transceiver can at least open a communication session with the external device during the MRI scanning sequence. The processor may be configured to manage generation of the MRI-INC biological signal by at least one of filtering the biological signal or subtracting a noise template from the biological signal. The noise template may be indicative of MRI induced noise.

Optionally, the processor may be configured to modify the segment of the biological signal corresponding to at least one of leading or trailing transition portions of the active field interval. The IMD may comprise a field detector circuit configured to directly detect a transition portion of the active field interval from at least one of the RF or gradient fields. The IMD may comprise a transceiver configured to receive wirelessly an MRI sequence information from the external device. The MRI sequence information may include the start times for the active field intervals. The processor may be configured to utilize the MRI sequence information to at least one of apply the blanking interval or modify the segments of the biological signal occurring during the start times for the active field intervals.

Optionally, the IMD may include a transceiver configured to receive a series of active field notifications before the corresponding active field intervals. The processor may be configured to determine the start times based on the active field notifications. The IMD may include a transceiver configured to receive MRI sequence information that may include at least one of a gradient waveform, slew rate and timing, on/off times or a derivative of gradient waveform. The IMD may include a transceiver configured to receive MRI sequence information that may include at least one of a RF waveform, slew rate and timing, on/off times or a derivative of RF waveform. The processor may be further configured to identify segments of the biological signals based on the MRI sequence information. The segments may include MRI induced noise.

Optionally, in response to a determination that the patient is experiencing the non-physiologic condition, the processor may be further configured to synchronize MRI data acquisition with collection of biological signals by the IMD by directing a transceiver to transmit, to the external device, a request for an MRI scanner to pause or halt the MRI procedure. The processor may collect additional biological signals, during an interrupt interval, while the MRI procedure is paused or halted such that the additional biological signals do not include MRI induced interference and may analyze the additional biological signals for a confirmation or denial that the patient is experiencing the non-physiologic condition.

Optionally, the IMD may comprise one or more electrodes or other electrical sensors coupled to the sensing circuitry and may be configured to measure signals indicative of at least one of a cardiac activity characteristic, neurological characteristic, hemodynamic characteristic or body generated analyte. The biological signals may include at least one of cardiac activity signals, cardiac impedance, pulmonary impedance, transthoracic impedances, accelerometer signatures, heart sounds, pulmonary arterial pressure signals, blood pressure, body temperature, mechanical circulatory support (MCS) rpm levels, or MCS flow rates.

Optionally, the IMD may include an optical photoplethysmography (PPG) sensor configured to sense PPG signals. The processor, when executing the program instructions, may be configured to analyze the PPG signals for an indication that the patient is experiencing the non-physiologic condition. The processor may be further configured to select between first and second sensing modes. When in the first sensing mode, the processor may turn on the sensing circuitry to sense the biological signals and the PPG sensor to sense PPG signals both during the MRI scanning sequence. When in the second sensing mode, the processor may turn off the sensing circuitry to prevent sensing of the biological signals during the MRI scanning sequence and turn on the PPG sensors to sense PPG signals during the MRI scanning sequence. The IMD may analyze at least one of the biological signals or PPG signals for the indication that the patient may be experiencing the non-physiologic condition.

In accordance with embodiments herein, a method is provided. The method obtains electrical biological signals, within an implantable medical device (IMD), indicative of a non-physiologic condition of interest experienced by a patient during a magnetic resonance imaging (MRI) procedure, and in the presence of an MRI scanning sequence, the MRI scanning sequence includes at least one of radio frequency (RF) or gradient fields that are in an active state for active field intervals. The method is under control of one or more processors. The method determines start times for the active field intervals when the at least one of RF or gradient fields switch to the active state. The method manages generation of MRI-induced-noise corrected (MRI-INC) biological signals, based on the start times for the active field intervals, by at least one of: 1) applying a blanking interval to the sensing circuitry to blank a sensing operation during at least leading transition portions of the active field interval; or 2) modifying segments of the biological signal sensed during at least the leading transition portions of the active field interval. The method analyzes the biological signals for an indication that the patient is experiencing the non-physiologic condition.

Optionally, the method may transmit the biological signals from the IMD to at least one of an MRI field monitoring device, external controller, or MRI scanner console. The determining and managing operations may be performed by at least one of an MRI field monitoring device, external controller or MRI scanner console, receiving the MRI-INC biological signals at the IMD. The analysis may determine a presence of the non-physiologic condition, may transmit an instruction to the MRI scanner to halt the MRI scanning sequence. The transmitting operation may be performed by at least one of the IMD, an MRI field monitoring device or an external controller. The method may determine when a transceiver of the IMD can at least open a communication session with at least one of an MRI field monitoring device, external controller or MRI scanner console during the MRI scanning sequence.

Optionally, the method may manage generation of the MRI-INC biological signal by at least one of filtering the biological signal or subtracting a noise template from the biological signal. The noise template may be indicative of MRI induced noise. The at least one of filtering or subtracting or template matching may be performed by the one or more processors of at least one of the IMD, an MRI field monitoring device, external controller or MRI scanner console. The method may modify the segment of the biological signal corresponding to transition portions of the active field interval. The method may utilize a field detector circuit in the IMD to directly detect a transition portion of the active field interval from at least one of the RF or gradient fields.

Optionally, the method may wirelessly receive MRI sequence information from at least one of an MRI field monitoring device, external controller or MRI scanner console. The MRI sequence information may include at least one of start times for the active field intervals, a gradient waveform, slew rate and timing, gradient field on/off timing, or a derivative of the gradient waveform. The method may utilize the MRI sequence information to at least one of apply the blanking interval or modify the segments of or template matching the biological signal occurring during the start times for the active field intervals. The method may wirelessly receive, at the IMD, a series of active field notifications before the corresponding active field intervals. The processor may be configured to determine the start times based on the active field notifications.

Optionally, the method may identify segments of the biological signals temporally aligned with the active field intervals. The segments may include MRI induced interference. In response to a determination that the patient may be experiencing the non-physiologic condition, the method may synchronize MRI data acquisition with collection of biological signals by the IMD by directing the transceiver to transmit, to the external device, a request for an MRI scanner to pause or halt the MRI procedure. The method may collect additional biological signals, during an interrupt interval, while the MRI procedure is paused or halted such that the additional biological signals do not include MRI induced interference. The method may analyze the additional biological signals for a confirmation or denial that the patient is experiencing the non-physiologic condition.

In accordance with embodiments herein, a magnetic resonance imaging (MRI) field monitoring device to monitor an MRI scanning sequence that includes gradient fields that are switched between active and inactive states is provided. The device includes a transmitter configured to communicate with an implantable medical device (IMD). The device includes a gradient field detector circuit configured to acquire gradient field data indicative of gradient fields generated by an MRI scanner during the MRI scanning sequence. The device includes a data acquisition (DA) module including memory and a processor. The memory is configured to store program instructions. The processor, when executing the program instructions, is configured to analyze the gradient field data to determine a series of start times for corresponding active field intervals when the gradient field iteratively switches to the active state and direct the transceiver to transmit a series of active field notifications to the IMD in connection with the start times for the corresponding active field intervals.

Optionally, the gradient field detector circuit may be further configured to directly detect leading transition portions for the corresponding active field intervals. The processor may be configured to determine the start times based on the corresponding leading transition portions. The gradient field detector circuit may be further configured to directly detect real-time gradient waveform for the corresponding active field intervals. The processor may be configured to determine the predicted noise signal as a weighted average of the recorded signal from each gradient axis. The device may include a radio frequency (RF) field detector circuit configured to acquire RF field data indicative of RF fields generated by the MRI scanner during the MRI scanning sequence. The processor, when executing the program instructions, may analyze the RF field data to determine a series of RF start times for corresponding RF active field intervals when the RF field iteratively switches to the active state and may direct the transceiver to transmit a series of active field notifications to the IMD in connection with the RF start times for the RF active field intervals for the corresponding RF fields.

Optionally, the RF field detector circuit may be further configured to directly detect leading transition portions for the corresponding RF active field intervals of the RF fields. The processor may be configured to determine the RF start times based on the corresponding RF leading transition portions. The RF field detector circuit may be further configured to directly detect real-time RF waveform for the corresponding active field intervals. The processor may be configured to determine the predicted noise signal as the envelope of the recorded signal. The RF field detector circuit may be further configured to directly detect real-time RF waveform for the corresponding active field intervals. The processor may be configured to determine the static field strength of the MRI scanner corresponding to the measured RF frequency divided by gyromagnetic ratio of hydrogen.

Optionally, the gradient field detector circuit may include a 3-axis loop tuned to have at least one of: i) sensitivity to AC fields having a frequency between 500 Hz and 5 kHz or ii) a field strength between 1 mT and 50 mT. The RF field detector circuit may include a loop antenna to detect an RF magnetic field having a center frequency between 4 MHz and 300 MHz.

Optionally, the device may include a receiver configured to receive sensed electrical biological signals indicative of a non-physiologic condition of interest experienced by a patient during an MRI procedure, and in the presence of the MRI scanning sequence. The processor, when executing the program instructions, may be further configured to modify segments of the biological signal sensed during at least the leading transition portions of the active field interval to form MRI-induced-noise corrected (MRI-INC) biological signals and analyze the biological signals for an indication that the patient is experiencing the non-physiologic condition.

In accordance with embodiments herein, a method to monitor a magnetic resonance imaging (MRI) scanning sequence of a patient having an implantable medical device (IMD) is provided. The method acquires gradient field data indicative of gradient fields generated by an MRI scanner during the MRI scanning sequence. The method analyzes the gradient field data to determine a series of start times for corresponding active field intervals when the gradient field iteratively switches to the active state and directs a transceiver to transmit a series of active field notifications to the IMD in connection with the start times for the corresponding active field intervals.

Optionally, the method may utilize a gradient field detector circuit to directly detect leading transition portions for the corresponding active field intervals and may determine the start times based on the corresponding leading transition portions. The method may acquire RF field data indicative of RF fields generated by the MRI scanner during the MRI scanning sequence. The method includes program instructions, configures to analyze the RF field data to determine a series of RF start times for corresponding RF active field intervals when the RF field iteratively switches to the active state and direct a transceiver of an external device to transmit a series of active field notifications to the IMD in connection with the RF start times for the RF active field intervals for the corresponding RF fields.

Optionally, the RF field detector circuit may be further configured to directly detect leading transition portions for the corresponding RF active field intervals of the RF fields. The method may determine the RF start times based on the corresponding RF leading transition portions. The method may receive sensed electrical biological signals indicative of a non-physiologic condition of interest experienced by a patient during an MRI procedure, and in the presence of the MRI scanning sequence. The method may modify segments of the biological signal sensed during at least the leading transition portions of the active field interval to form MRI-induced-noise corrected (MRI-INC) biological signals and may analyze the biological signals for an indication that the patient is experiencing the non-physiologic condition.

In accordance with embodiments herein, an implantable medical device (IMD) is provided and includes sensing circuitry coupled to electrodes. The sensing circuitry is configured to sense electrical biological signals indicative of a non-physiologic condition of interest experienced by a patient. The IMD includes an optical photoplethysmography (PPG) sensor configured to sense PPG signals, a transceiver configured to communicate with an external device and memory to store the biological signals and to store program instructions. The IMD includes a processor that, when executing the program instructions, is configured to determine when a communication session can be opened between the IMD and the external device during a magnetic resonance imaging (MRI) procedure and in the presence of an MRI scanning sequence, the MRI scanning sequence includes at least one of radio frequency (RF) or gradient fields that are in an active state for active field intervals. The processor selects between first and second sensing modes. When in the first sensing mode, the processor turns on the sensing circuitry to sense the biological signals and the PPG sensor to sense PPG signals both during the MRI scanning sequence. When in the second sensing mode, the processor turns off the sensing circuitry to prevent sensing of the biological signals during the MRI scanning sequence and turn on the PPG sensors to sense PPG signals during the MRI scanning sequence. The IMD analyzes at least one of the biological signals or PPG signals for an indication that a patient is experiencing a non-physiologic condition.

Optionally, the processor, when executing the program instructions, may be configured to analyze the PPG signals for an indication that the patient is experiencing the non-physiologic condition. The processor may be further configured to determine when the non-physiologic condition represents a cardiac event of interest or other abnormal hemodynamic event of interest. When the cardiac event, hemodynamic or other physiologic condition of interest exists or exceeds a threshold, the processor may be further configured to perform a therapy monitoring operation to collect at least one of additional PPG signals or additional biological signals for analysis to verify the non-physiologic condition.

Optionally, when operating in the second sensing mode, the processor may be further configured to direct the transceiver to transmit, to the external device, a request to pause or halt the MRI procedure. The processor may collect biological signals, during an interrupt interval, while the MRI procedure is paused or halted such that the biological signals do not include MRI induced interference and may analyze the biological signals for a confirmation or denial that the patient is experiencing the non-physiologic condition.

Optionally, when in the first sensing mode, the processor may be further configured to determine start times for active field intervals when the at least one of RF or gradient fields switch to the active state. The processor may manage generation of MRI-induced-noise corrected (MRI-INC) biological signals, based on the start times for the active field intervals, by at least one of: 1) applying a blanking interval to the sensing circuitry to blank a sensing operation during at least leading transition portions of the active field interval or 2) modifying segments of the biological signal sensed during at least the leading transition portions of the active field interval. The processor may analyze the biological signals for an indication that the patient is experiencing the non-physiologic condition.

Optionally, the method may include a field detector circuit configured to directly detect the active field interval for at least one of the RF or gradient fields. The biological signals may represent cardiac activity signals and the non-physiologic condition represents an arrhythmia.

In accordance with embodiments herein, a method for managing an implantable medical device (IMD) is provided. The method may utilize implanted electrodes to sense electrical biological signals indicative of a non-physiologic condition of interest experienced by a patient. The method may utilize an optical photoplethysmography (PPG) sensor to sense PPG signals. The method may determine when a communication session can be at least opened between the IMD and an external device during a magnetic resonance imaging (MRI) procedure and in the presence of an MRI scanning sequence. The MRI scanning sequence may include at least one of radio frequency (RF) or gradient fields that are in an active state for active field intervals. The method may between first and second sensing modes based on the determination. When in the first sensing mode, the method turns on the sensing circuitry to sense the biological signals and turning on the PPG sensor to sense PPG signals both during the MRI scanning sequence. When in the second sensing mode, the method turns off the sensing circuitry to prevent sensing of the biological signals during the MRI scanning sequence and turning on the PPG sensors to sense PPG signals during the MRI scanning sequence. The method analyzes at least one of the biological signals or PPG signals for an indication that a patient is experiencing a non-physiologic condition.

Optionally, the method may analyze the PPG signals for an indication that the patient may be experiencing the non-physiologic condition. The method may determine when the non-physiologic condition represents a cardiac event of interest or other abnormal hemodynamic event of interest. When the cardiac event, hemodynamic or other physiologic condition of interest exists or exceeds a threshold, the method may further comprise performing a therapy monitoring operation to collect at least one of additional PPG signals or additional biological signals for analysis to verify the non-physiologic condition.

Optionally, the method may direct a transceiver to transmit, to an external device, a request to pause or halt the MRI procedure. The method may collect biological signals, during an interrupt interval, while the MRI procedure is paused or halted such that the biological signals do not include MRI induced interference and may analyze the biological signals for a confirmation or denial that the patient is experiencing the non-physiologic condition. The method may direct a transceiver to transmit, to an external device, a request to restart or resume the MRI procedure if patient id determined to be in physiologic condition.

Optionally, when in the first sensing mode, the method may determine start times for active field intervals when the at least one of RF or gradient fields switch to the active state. The method may manage generation of MRI-induced-noise corrected (MRI-INC) biological signals, based on the start times for the active field intervals, by at least one of: 1) applying a blanking interval to the sensing circuitry to blank a sensing operation during at least leading transition portions of the active field interval or 2) modifying segments of the biological signal sensed during at least the leading transition portions of the active field interval. The method may analyze the biological signals for an indication that the patient is experiencing the non-physiologic condition.

Optionally, the analyzing operation may further include identifying, as the non-physiologic condition, an abnormal, unhealthy state of a patient condition of interest corresponding to at least one of the following: arrhythmias, unstable hemodynamic performance, pain, tremors, Parkinson's disease, tinnitus, Alzheimer's disease, blood pressure, pulse oximetry levels, or diabetes.

In accordance with embodiments herein, a system to communicate with a magnetic resonance imaging (MRI) scanner is provided and includes memory to store program instructions. The system includes a transceiver that is configured to operate in a presence of an MRI scanning sequence that includes gradient fields that are switched between active and inactive states, the transmitter configured to communicate with an implantable medical device (IMD). The system includes one or more processors that, when executing program instructions, are configured to at least one: i) direct the transceiver to transmit MRI sequence information to the IMD, ii) receive electrical biological signals, sensed by the IMD, indicative of a non-physiologic condition of interest experienced by a patient during the MRI procedure; iii) analyze the biological signals for an indication that the patient is experiencing the non-physiologic condition, or iv) manage generation of MRI-induced-noise corrected (MRI-INC) biological signals, based on the start times for the active field intervals, by at least one of: 1) applying a blanking interval to the sensing circuitry to blank a sensing operation during at least portions of the active field interval; 2) modifying segments of the biological signal sensed during at least the portions of the active field interval; or 3) template matching; or v) transmit MRI-INC biological signals to the IMD, vi) transmit an instruction to the MRI scanner to pause or halt the MRI procedure.

Optionally, the one or more processors may be further configured to analyze gradient field data to determine a series of start times for corresponding active field intervals and may direct the transceiver to transmit active field notifications to the IMD in connection with the start times for the corresponding active field intervals. The one or more processors may be further configured to direct the transceiver to transmit MRI sequence information to the IMD.

Optionally, the one or more processors may be further configured to receive electrical biological signals, sensed by the IMD, indicative of a non-physiologic condition of interest experienced by a patient during the MRI procedure. The processors may analyze the biological signals for an indication that the patient is experiencing the non-physiologic condition; and may manage generation of MRI-induced-noise corrected (MRI-INC) biological signals, based on the start times for the active field intervals, by at least one of: applying a blanking interval to the sensing circuitry to blank a sensing operation during at least portions of the active field interval; template matching; or modifying segments of the biological signal sensed during at least the portions of the active field interval.

Optionally, the one or more processors may be further configured to transmit MRI-INC biological signals to the IMD. The one or more processors may be further configured to transmit an instruction to the MRI scanner to pause or halt the MRI procedure. The one or more processors may be further configured to transmit an instruction to the IMD to deliver appropriate therapy.

Optionally, the system further comprises the IMD. The IMD further comprises a processor configured to manage generation of the MRI-INC biological signal by at least one of filtering the biological signal or subtracting a noise template from the biological signal, the noise template indicative of MRI induced noise.

BRIEF DESCRIPTION OF THE DRAWINGS

FIG. 2C illustrates examples for how various embodiments may modify biological signals using MRI sequence information in accordance with embodiments herein.

DETAILED DESCRIPTION

Figure 1A:
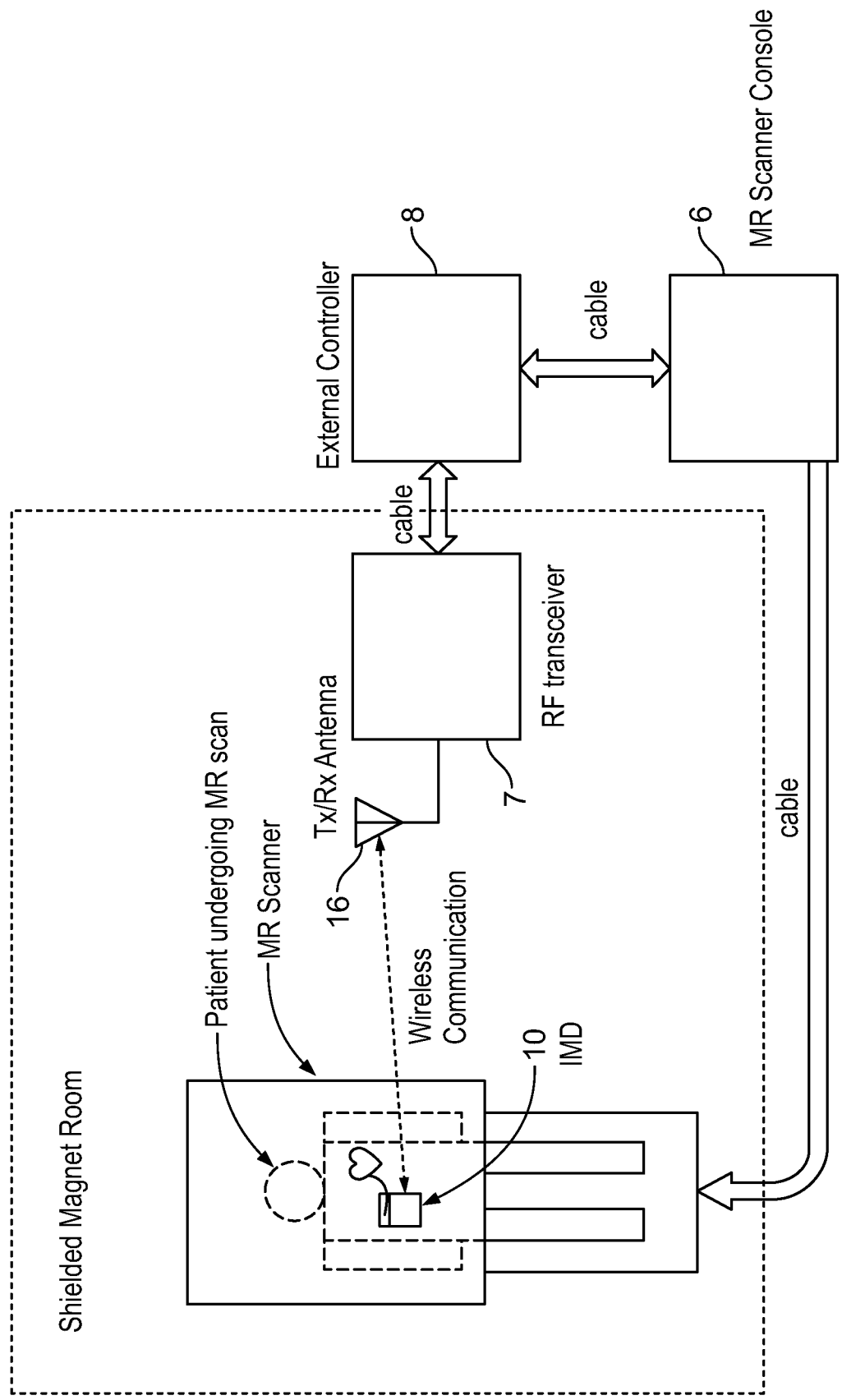
FIG. 1A illustrates an overall MRI system having an MRI machine operative to generate MRI fields during an MRI procedure for examining a patient.

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The methods described herein may employ structures or aspects of various embodiments (e.g., systems and/or methods) discussed herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. It should be noted that, other methods may be used, in accordance with an embodiment herein. Further, wherein indicated, the methods may be fully or partially implemented by one or more processors of one or more devices or systems. While the operations of some methods may be described as performed by the processor(s) of one device, additionally, some or all of such operations may be performed by the processor(s) of another device described herein.

Terms

The term "biological signal" shall include electrical signals measured by one or more electrodes or other electrical sensors coupled to an IMD within the patient, where the signals are indicative of a cardiac activity characteristic, hemodynamic characteristic and/or body generated analyte. The electrical signals are susceptible to MRI induced interference. Nonlimiting examples of biological signals include cardiac activity signals, neurological signals, cardiac impedance, pulmonary impedance, transthoracic impedances, accelerometer signatures, heart sounds, pulmonary arterial pressure signals, blood pressure, MCS rpm levels, MCS flow rates and the like. The biological signals do not include signals that are not susceptible to MRI interference, such optical photoplethysmography (PPG) signals, in which a light source emits light to a tissue and the photodetector measures the reflected light from the tissue.

The terms "body generated analyte" and "BGA" shall mean a test substance or specimen that is naturally generated by or naturally present in a human body. The test substance or specimen may be in liquid form (e.g., blood or other bodily fluid), solid form (e.g., tissue, fat, muscle, bone, or other organ-based material), gas form, cellular form or otherwise. Non-limiting examples of body generated analytes include hematocrit, troponin, brain natriuretic peptide, beta human chorionic gonadotropin (bHCG), carbon dioxide partial pressure (pCO.sub.2), partial pressure oxygen (pO.sub.2), pH, PT, ACT, activated partial thromboplastin time (APTT), sodium, potassium, chloride, calcium, urea, glucose, creatinine, lactate, oxygen, and carbon dioxide, thyroid stimulating hormone, parathyroid hormone, D-dimer, prostate specific antibody, $TCO_2$, Anion Gap, ionized calcium, urea nitrogen, lactose, hemoglobin, pH, $PCO_2$, $PO_2$, $HCO_3$, Base Excess, $O_2$, ACT Kaolin, ACT Celite, PT/INR, β-hCG, cTnI, CK-MB, BNP and the like, and combinations thereof. The analyte may be tested in a liquid sample that is whole blood, however other samples can be used including blood, serum, plasma, urine, cerebrospinal fluid, saliva and amended forms thereof. Amendments can include diluents and reagents such as anticoagulants and the like. As non-limiting examples, the physiologic BGA characteristic of interest (COI) may relate to diuretic response, CRS, intravascular volume depletion/overload, total body overload, malnutrition, peripheral edema, adenomatous GI tract absorption, liver congestion, liver protein generation state, hypoglycemic, hyperglycemic and the like.

Nonlimiting examples of BGA data include BGA data indicative of a level of an electrolyte COI of a patient. Electrolyte related BGA data may include a glucose level indicative of a blood sugar level for the patient, B-type natriuretic peptide (BNP) data, cardiac enzyme related BGA data (e.g., in connection with determining troponin I or troponin T levels). The method and system may further comprise identifying episodes of increased pulmonary arterial pressure (PAP) associated with a decrease in the blood glucose level, and based thereon, may generate the HF diagnosis that avoids an increase in a dosage of the diuretic prescription.

The terms "cardiac activity signal", "cardiac activity signals", "CA signal" and "CA signals" (collectively "CA signals") are used interchangeably throughout to refer to an analog or digital electrical signal recorded by two or more electrodes positioned transvenously, subcutaneous or cutaneous, where the electrical signals are indicative of cardiac electrical activity. The cardiac activity may be normal/healthy or abnormal/arrhythmic. Non-limiting examples of CA signals include ECG signals collected by cutaneous electrodes, and EGM signals collected by subcutaneous or transvenous electrodes.

The term "IMD data" shall refer to any and all types of information and signals conveyed from an implantable medical device to a local or remote external device. Non-limiting examples of IMD data include cardiac activity signals (e.g., intracardiac electrogram or IEGM signals), neural activity signals, impedance signals (e.g., cardiac, pulmonary or transthoracic impedances), accelerometer signatures (e.g., activity signals, posture/orientation signals, heart sounds), pulmonary arterial pressure signals, blood pressure, mechanical circulatory support (MCS) rpm levels, MCS flow rates and the like.

The terms "physiologic condition" and "non-physiologic condition" are used to distinguish between a normal/healthy state of a patient condition of interest and an abnormal/unhealthy state of the patient condition of interest, respectively. Non-limiting examples of patient conditions of interest include electrical or hemodynamic cardiac behavior (e.g. normal sinus rhythms, arrhythmias, unstable hemodynamic performance), neurological behavior (e.g. pain, tremors, Parkinson's disease, tinnitus, Alzheimer's disease, and other neurological disorders measurable and treatable within the spine, brain and peripheral muscles), blood pressure, pulse oximetry levels, diabetes and other conditions due to imbalances/deficiencies of body generated analytes.

The term "real-time" shall refer to a time period substantially contemporaneous with an event of interest, such as during an MRI procedure while a patient remains stationary within an MRI scanner. The term "real-time," when used in connection with collecting and/or processing data utilizing an IMD, shall refer to processing operations performed substantially contemporaneous with a physiologic event of interest experienced by a patient. By way of example, in accordance with embodiments herein, cardiac activity signals are analyzed in real time (e.g., during a cardiac event or within a few minutes after the cardiac event). The term "real-time," when used in connection with a body generated analyte, shall refer to operations performed substantially contemporaneous with an occurrence of a characteristic of interest experienced by the patient (e.g excessive generation of a BGA, drop in blood pressure, rise in temperature). By way of example, in accordance with embodiments herein, the body generated analyte may correspond to serum albumin that is analyzed and utilized in a diagnosis and treatment recommendation.

The term "treatment notification" shall mean a communication and/or device command to be conveyed to one or more individuals and/or one or more other electronic devices, including but not limited to, network servers, workstations, laptop computers, tablet devices, smart phones, IMDs and the like. When a treatment notification is provided as a communication, the treatment notification may represent an audio, video, vibratory or other user perceivable medium. The communication may be presented in various formats, such as to display patient information, messages, user directions and the like. The communication is presented on one or more of the various types of electronic devices described herein and may be directed to a patient, a physician, various medical personnel, various patient record management personnel and the like. The communication may represent an identification of a patient diagnosis and various treatment recommendations. The diagnosis and treatment recommendation may be provided directly to the patient or to a physician or other medical practitioner operating the MRI scanner. For example, in some circumstances, a diagnosis and treatment recommendation may be to modify a dosage level during the MRI scan, in which case, the notification may be provided to the physician or medical practitioner.

When a treatment notification is provided as a device command, the treatment notification may represent an electronic command directing a computing device (e.g., IMD, MRI equipment, local external device, server) to perform an action. For example, the action may include directing the following: IMD to provide additional IMD data; IMD to collect additional data and/or another type of data; IMD to deliver a therapy and/or modify a prior therapy (e.g., a pacing therapy, neural stimulation therapy, appetite suppression therapy, drug delivery rate); and a server to analyze further information in the patient medical record and/or from another medical record. As nonlimiting examples, a treatment notification may represent a command communicated from an IMD directly to an MRI scanner console and/or to an MRI field monitoring device or other RF transceiver directly or indirectly coupled to the MRI system. As one nonlimiting example, the command may direct the MRI system to stop or pause a scan, such as to allow the IMD to collect additional clean biological signals.

The term "obtain" or "obtaining", as used in connection with data, signals, information and the like, includes at least one of i) accessing memory of an external device or remote server where the data, signals, information, etc. are stored, ii) receiving the data, signals, information, etc. over a wireless communications link between the IMD and a local external device, and/or iii) receiving the data, signals, information, etc. at a remote server over a network connection. The local external device may represent an MRI scanner console, an MRI field monitoring device, and/or RF transceiver coupled to various other computing systems. The obtaining operation, when from the perspective of an IMD, may include sensing new signals in real time, and/or accessing memory to read stored data, signals, information, etc. from memory within the IMD. The obtaining operation, when from the perspective of a local external device, includes receiving the data, signals, information, etc. at a transceiver of the local external device where the data, signals, information, etc. are transmitted from an IMD and/or a remote server. The obtaining operation may be from the perspective of a remote server, such as when receiving the data, signals, information, etc. at a network interface from a local external device and/or directly from an IMD. The remote server may also obtain the data, signals, information, etc. from local memory and/or from other memory, such as within a cloud storage environment and/or from the memory of a workstation or clinician external programmer.

Overview of MRI-Responsive Systems and Procedures

FIG. 1A illustrates an overall MRI system 2 having an MRI machine 4 operative to generate MRI fields during an MRI procedure for examining a patient. The MRI machine operates under the control of an MRI scanner console 6, which controls the strength and orientation of the fields generated by the MRI machine and derives images of portions of the patient therefrom, in accordance with otherwise conventional techniques. MRI machines and imaging techniques are well known and will not be described in detail herein. See, for example, U.S. Pat. No. 5,063,348 to Kuhara et al., entitled "Magnetic Resonance Imaging System" and U.S. Pat. No. 4,746,864 to Satoh, entitled "Magnetic Resonance Imaging System", the complete subject matter of which are incorporated herein by reference. Optionally, an RF transceiver 7 and external controller 8 are also provided to communicate during the MRI procedure with an implantable medical device (IMD) 10 implanted within the patient to receive transmissions of biological signals (e.g., electrophysiological signals and/or hemodynamic signals) sensed within the patient by the IMD 10 during the MRI procedure, as well as other diagnostic data to be described in greater detail below. The RF transceiver 7 may be omitted entirely. The IMD 10 may be constructed in various manners. For example, the IMD 10 may include a lead system for sensing electrophysiological signals within the heart of the patient, and for delivering any needed pacing pulses or shock therapy. In general, any of the sensed biological signals may be transmitted to the external monitoring system during the MRI procedure for display thereon.

The IMD 10 and/or lead system may also include various biological sensors (not separately shown within FIG. 1) for sensing hemodynamic signals or other signals within the patient, such as sensors operative to sense intracardiac pressure, blood oxygen saturation (i.e. blood $SO_2$), blood temperature, body temperature and PPG signals, etc. In some cases, the sensors may be implanted elsewhere in the patient or may be mounted in or on the IMD itself. In any case, any of the various biological signals sensed using the sensors might potentially be transmitted to the external controller 8 during the MRI procedure for display thereon. Also, as will be further explained, during the MRI procedure, the IMD also analyzes the various sensed signals to detect abnormal conditions such as tachyarrhythmias, sudden drops in blood pressure, sudden changes in blood temperature, etc. Warning signals pertaining to any such abnormal conditions may also be transmitted from the IMD to the external controller 8 during the MRI procedure for review. Still further, the lead system is preferably equipped with one or more temperature sensors (not shown in FIG. 1) for detecting temperatures. Warnings and other information pertaining to lead and/or IMD temperatures or induced currents may also be transmitted to the external monitoring system during the MRI procedure for review. Depending upon the nature of the warning, the external monitoring system may deactivate the MRI machine by sending appropriate control signals to the MRI scanner console.

Various configurations may be implemented to permit communication with the IMD during the MRI procedure. in the example of FIG. 1A, the RF 7 is transceiver connected to a telemetry antenna 16 that communicates via MICS, Bluetooth, ISM channels and/or another wireless protocol, with corresponding telemetry components within the IMD. Wireless communication between the IMD, the external device and MRI system in the presence of RF and gradient field exposure is possible given that the MRI RF field (e.g. 64 MHz for 1.5 T, 128 MHZ for 3 T) and the gradient field (approximately 1 kHz) frequencies are well below the MICS and Bluetooth frequencies of 400 MHz and 2.4 GHz, respectively. The higher frequency harmonic signal caused by the MRI RF and gradient fields should be relatively minor as compared to wireless communication signal strength in the MICS and Bluetooth frequencies and should not affect wireless medication.

The external controller 8 is configured to process data to be shared between the IMD and the MR scanner console. The external controller 8 represents one type of external device configured to communicate with an IMD. As non-limiting examples, the external controller 8 may represent a standalone computer running various data processing software or a software module running on an MRI console computer, which is directly connected to the RF transceiver via cable connections. As one example, the RF telemetry antenna of the external controller 8 periodically emits suitable MRI notification signals. The IMD 10 is equipped to sense such notification signals to thereby detect entry of the patient into the MRI procedure room. Upon detection of such entry, the IMD 10 may switch to an MRI mode wherein the IMD activates various filtering procedures for use in the presence of MRI fields. Additionally or alternatively, the external device may direct the IMD to enter the MRI mode. Optionally, the IMD may begin transmitting biological signals of interest (e.g., IEGM signals) to the external controller 8 for display. For example, the IMD 10 may provide baseline signals for comparison against signals subsequently transmitted during the MRI procedure. The IMD 10 may transmit biological signals indicative of a non-physiologic condition for real-time review by a clinician while the patient still remains within the MRI scanner. The IMD continues to operate in the MRI mode throughout the MRI procedure and does not switch back to normal processing modes until the patient has eventually been removed from the MRI procedure room (e.g., as detected based on loss of reception of the periodic notification signals).

While embodiments herein may illustrate and/or describe electrodes and/or conductors within leads, many of the sensors may also be housed inside the can of the IMD. Gradient signals can penetrate inside of the can and therefore be detected by sensor circuitry inside of the housing. Accordingly, ICMs and leadless IMDs, even though they don't have leads, are susceptible to RF and gradient MRI induced noise, to which embodiments are applicable.

Basic Principles of MRI Imaging

As explained in "Vascular Medicine: A Companion to Braunwald's Heart Disease (Second Edition)", 2013, Chapter 13 "Magnetic Resonance Imaging" (Pages 166-183 by Cihan Duran, Piotr S Sobieszczyk and Frank J. Rybicki, magnetic resonance imaging (MRI) relies upon the inherent magnetic properties of human tissue and the ability to use these properties to produce tissue contrast. Magnetic resonance imaging detects the magnetic moment created by single protons in omnipresent hydrogen atoms. Because any moving electric charge produces a magnetic field, spinning protons produce small magnetic fields and can be thought of as little magnets or "spins." When a patient is placed in the bore of a large magnet (i.e., MRI scanner), hydrogen protons align with the externally applied static magnetic field (B0) to create a net magnetization vector. On a quantum level, most protons will distribute randomly, either with or against the scanner's B0. However, a slight excess of spins aligns with the field, causing net tissue magnetization. The time required for this alignment is denoted by the longitudinal relaxation time, T1. T1 variations between tissues is used to provide contrast.

Duran et al, go on to explain that spinning protons wobble or "precess" about the axis of B0. The frequency of the wobble is proportional to the strength of B0. If a radiofrequency (RF) pulse is applied at the resonance frequency of the wobble, protons can absorb energy and jump to a higher energy state. This RF pulse deflects the protons, creating a new net magnetization vector distinct from the major axis of the applied magnetic field. The net magnetization vector tips from the longitudinal to the transverse plane (transverse magnetization). The protons are "flipped" by the RF pulse, and the net magnetization vector is defined by a "flip angle." The stronger the RF pulse applied, the greater the angle of deflection for the magnetization. Common flip angles for spin echo are 90° and 180°. For gradient echo (GRE) MRI, flip angles typically range between 10° and 70°. After the RF pulse tips the spinning protons out of alignment with the main magnetic field, new protons begin to align with the main magnetic field at a rate determined by the T1 relaxation time.

In spin echo imaging technique, the echo is obtained by using a refocusing 180° RF pulse, after which the spins begin to dephase. Another 180° RF pulse can be applied to generate a second echo and so on. Signal loss at longer echo times reflects tissue T2. In GRE imaging, the echo is obtained by gradient reversal rather than RF pulse. Because this includes effects from tissue homogeneity, TE-dependent signal loss reflects T2.

Magnetic Resonance Imaging (MRI) scanners generate three electromagnetic fields that are used to produce an MRI image. These include a static magnetic field, a time varying gradient magnetic field and a time varying RF field. The time varying gradient magnetic field, more specifically the rapid switching of gradient magnetic fields (gradient ramping) can interfere with sensing of biological signals (e.g. neurological signals, impedance signals, electrophysiological signals) in an IMD as it can invoke non-physiological noise in IMD's sensing circuitry. In some instances, the time varying RF field may also interfere with sensing of biological signals. More specifically, the RF and/or gradient fields transition between active and inactive states for predetermined short active field intervals in accordance with an MRI scanning sequence. During the transition from an inactive state to an active state, the RF or gradient field exhibits a leading transition portion. The RF or gradient field exhibit a trailing transition portion when the RF or gradient field transitions from the active state to the inactive state.

In accordance with embodiments herein, it is been found that noise/interference is introduced, into the electrically sensed biological signals, by the RF or gradient fields, during at least the leading and trailing transition portions. Embodiments herein correct or otherwise compensate for such MRI-induced noise/interference.

Figure 1B:
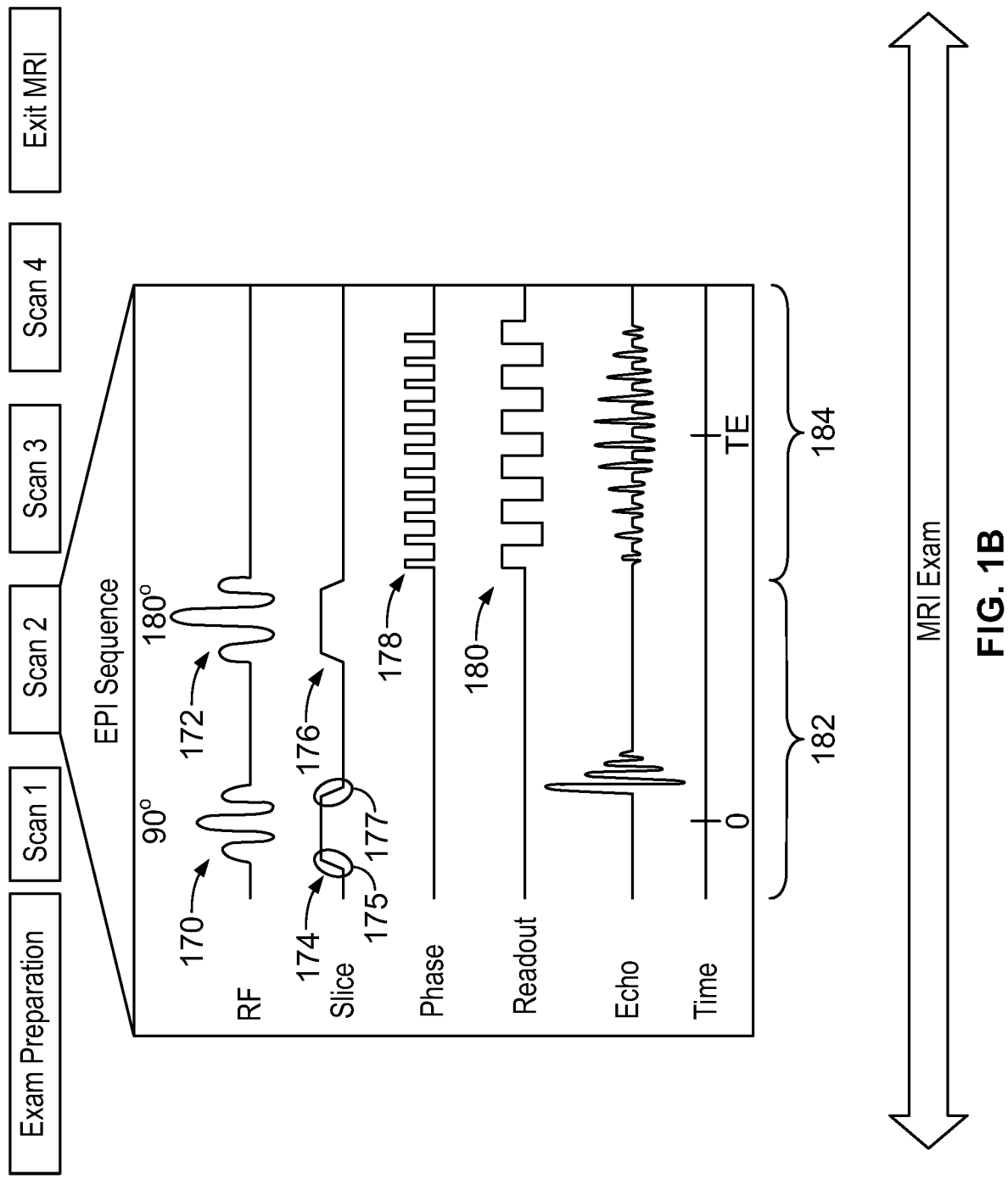
FIG. 1B illustrates an example of an MRI procedure beginning with an exam preparation phase followed by a series of scan phases, followed by exiting of the MRI procedure.

FIG. 1B illustrates an example of an MRI procedure beginning with an exam preparation phase followed by a series of scan phases (denoted scan 1, scan 2, scan 3, scan 4), followed by exiting of the MRI procedure. During each individual scan phase, an MRI sequence is followed. In the present example, an echo planar imaging (EPI) sequence is illustrated for one scan phase (scan 2). It is recognized that the illustration in FIG. 1B is merely representative of one example. The sequence includes RF field bursts delivered at 170 and 172, and separated by a predetermined amount of time. The RF field bursts are iteratively generated over the series of scan phases. A slice selection gradient field is delivered at burst 174, 176. A phase encoding gradient field is delivered at 178, while a frequency encoding gradient field is delivered at 180. The interval at 182 is generally referred to as a slice selection and spin preparation interval, while the interval at 184 is generally referred to as a readout interval. The slice selection, phase encoding and frequency encoding gradient fields 174-180 are generally denoted to transition between low/inactive states and high/active states, with the corresponding fields remaining active for various durations. The slice selection, phase encoding and frequency encoding gradient fields are iteratively generated over the series of scan phases.

In accordance with embodiments herein, it has been found that the RF/gradient ramping between the low/inactive and high/active states of the various gradient/RF fields 174-180, introduces MRI induced interference into the biological signals sensed by the IMD. When the gradient fields 174-180 maintain a relatively constant strength, the biological signals do not experience notable or significant amounts of MRI induced interference. For example, gradient field ramping occurs at leading and trailing transition portions 175, 177 in the slice selection gradient field 174. Gradient ramping also occurs at each of the leading and trailing transition portions of the phase encoding and frequency encoding gradient fields 178, 180. Accordingly, the segments of the biological signals that overlap the intervals of gradient field ramping include MRI induced interference.

Figure 1C:
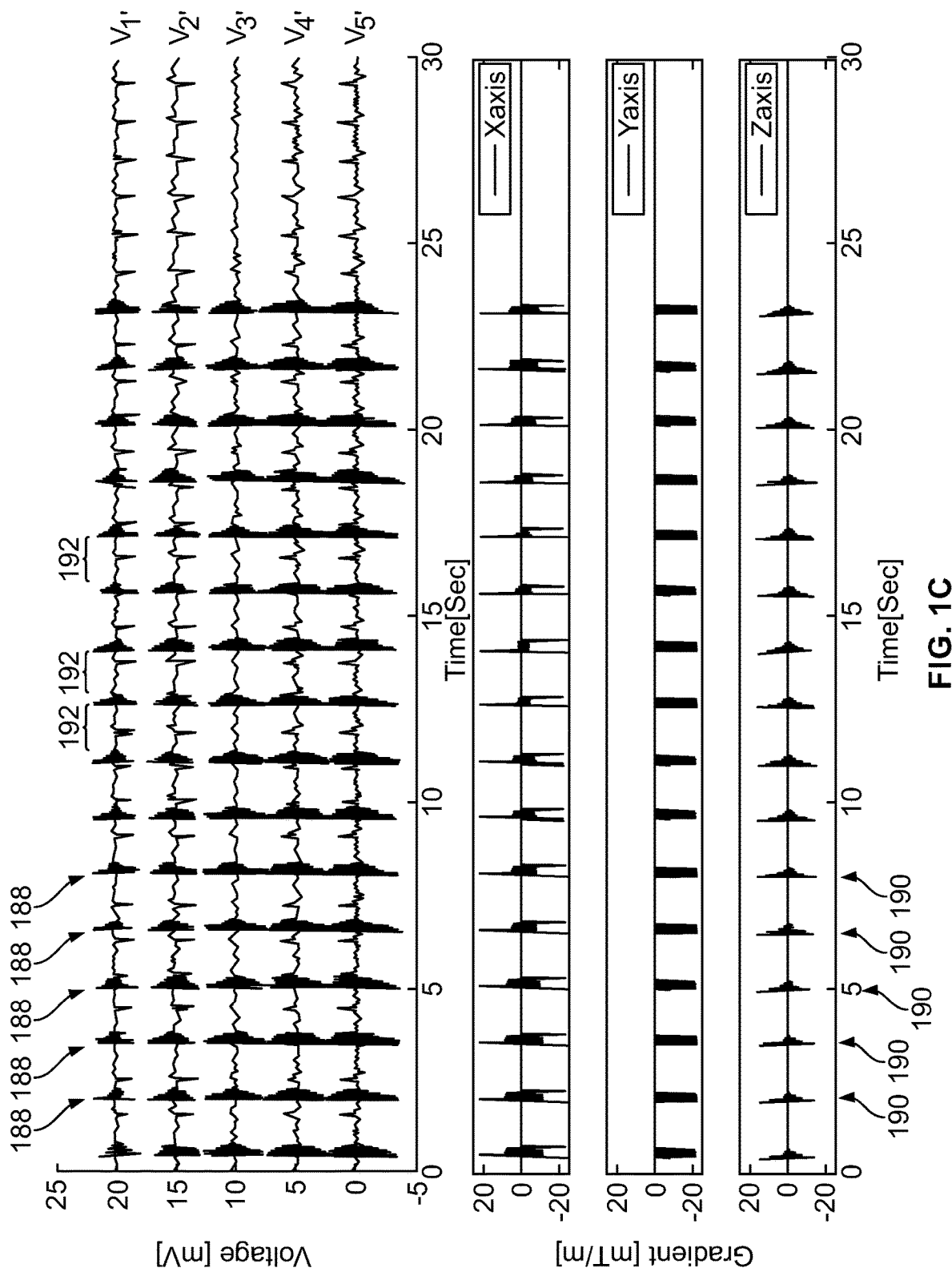
FIG. 1C illustrates an example of a relation between gradient fields and cardiac activity signals collected during the MRI procedure.

FIG. 1C illustrates an example of a relation between gradient fields and cardiac activity signals collected during the MRI procedure. The lower three panels illustrate examples of gradient fields applied during a clinical 3-D fast spin echo sequence with a TR interval of 1500 ms and an example of 16 echo trains. The upper panel plots cardiac activity signals collected along different vectors from a 12 lead surface ECG system.

The CA signals include segments 188 that are temporally aligned with the gradient fields 190 that occur along the X, Y and Z axes. The segments 188 represent biological signal segments that include MRI induced interference. The segments 188 are separated by segments 192 in which no MRI interference is present. As explained herein, various methods and systems are described to blank out or correct the segments 188 to avoid false determinations of a physiologic condition or a non-physiologic condition.

Communication Between IMD and MRI Scanner

Figure 2A:
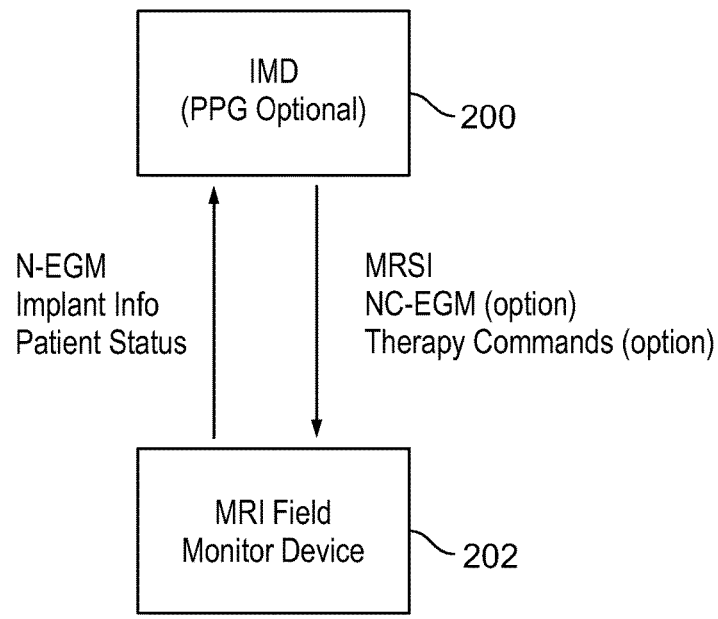
FIG. 2A illustrates a block diagram of a configuration in which an IMD may optionally wirelessly communicate with an MRI field monitoring device in accordance with embodiments herein.

FIG. 2A illustrates a block diagram of a configuration in which an IMD may optionally wirelessly communicate with an MRI field monitoring device in accordance with embodiments herein. The IMD 200 may optionally include the ability to collect and analyze PPG signals. The IMD 200 conveys noisy biological signals, such as noisy EGM signals to an MRI field monitoring device 202, alone or in combination with additional information regarding the IMD, as well as patient status information. The MRI field monitoring device 202 may return MRI-INC biological signals, such as noise corrected EGM signals. Additionally or alternatively, the MRI field monitoring device 202 may return therapy commands regarding a therapy to be delivered by the IMD. Additionally or alternatively, the MRI field monitoring device 202 may provide MRI sequence information. The details and alternative implementations associated with FIG. 2 a are described hereafter in more detail.

Figure 2B:
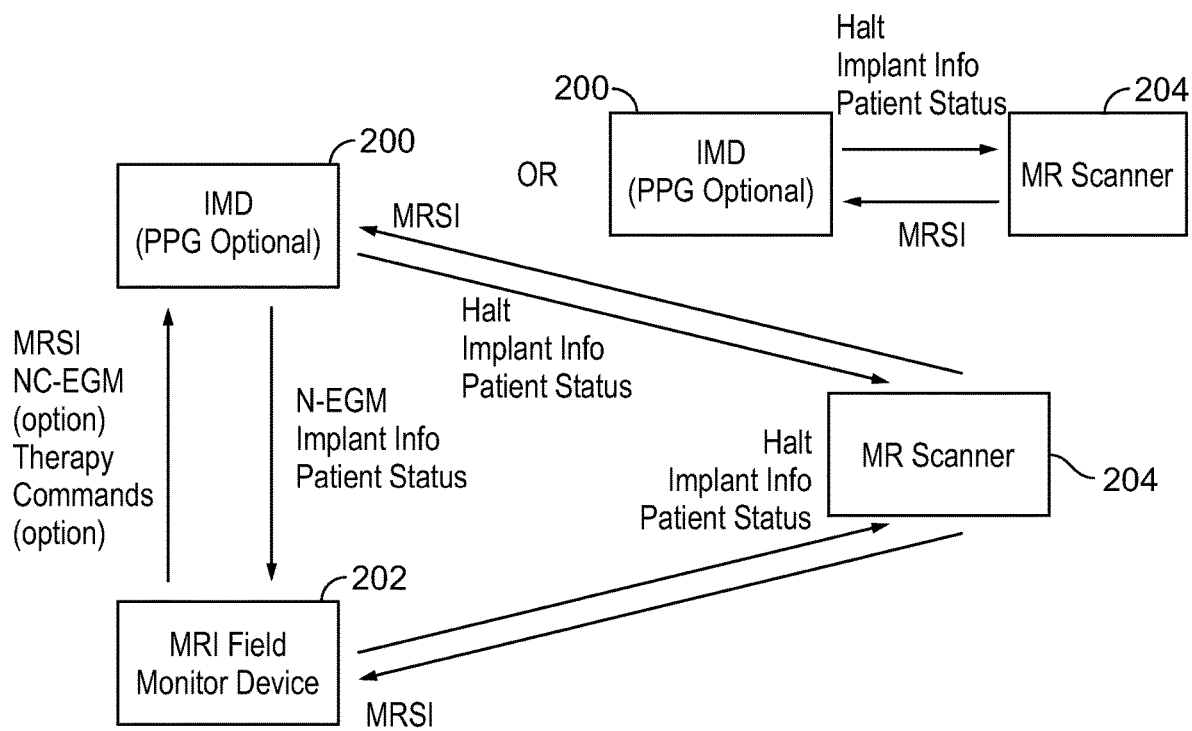
FIG. 2B illustrates block diagrams of alternative implementations that involve communication with an MRI scanner console in accordance with embodiments herein.

FIG. 2B illustrates block diagrams of alternative implementations that involve communication with an MRI scanner console in accordance with embodiments herein. In accordance with the configuration in the left panel, the IMD 200 may communicate directly with an MRI scanner console 204 and/or the MRI field monitoring device 202. In accordance with the configuration in the right panel, the IMD may communicate directly and only with the MRI scanner console, without a need to have an MRI field monitoring device.

With reference to the configuration in the right panel, the MRI scanner console 204 may provide MRI sequence information directly to the IMD 200. The IMD 200 may provide directly to the MRI scanner console instructions to pause or stop an MRI sequence, IMD identification information, patient status information, noisy and/or noise corrected biological signals and the like.

With reference to the configuration and the left panel, the IMD 200 may optionally include the ability to collect and analyze PPG signals. The MRI field monitoring device 202 and/or MRI scanner console 204, may provide MRI sequence information to the IMD 200. The IMD 200 may return noisy biological signals to the MRI field monitoring device. The IMD may wirelessly transmit, to the MRI field monitoring device 202, noisy biological signals, IMD identification information, patient status information and the like. The MRI field monitoring device 202 may convey instructions to pause or stop an MRI scanning sequence, IMD identification information and patient status information to the MRI scanner console 204. The MRI scanner console 204 may provide MRI sequence information to the MRI field monitoring device 202 which conveys the same information to the IMD 200. Optionally, the IMD may convey, directly to the MRI scanner console 204, instructions such as to pause or stop the MRI scanning sequence as well as information regarding the IMD and patient status information.

The IMD 200 may convey noisy and/or noise corrected biological signals, such as noisy/noise corrected EGM signals, to an MRI field monitoring device 202, alone or in combination with additional information regarding the IMD, as well as patient status information. The MRI field monitoring device 202 may return MRI-INC biological signals, such as noise corrected EGM signals. Additionally or alternatively, the MRI field monitoring device 202 may return therapy commands regarding a therapy to be delivered by the IMD.

The details and alternative implementations associated with FIG. 2B a are described hereafter in more detail.

FIG. 2C illustrates examples for how various embodiments may modify biological signals using MRI sequence information. The block at 220 denotes situations in which i) the IMD or MRI field monitoring device may receive the MRI sequence information from the MRI scanner console, ii) the IMD may receive MRI sequence information from an MRI field monitoring device and/or iii) the IMD includes sensors capable of directly measuring MRI and/or gradient fields. Based on the information collected at 220, processes are described herein to identify when RF or gradient fields are active, including the on and off points in time, such as associated with the leading and trailing transition portions of one or more RF or gradient pulses. When the on/off times are known, the MRI induced noise within the biological signal may be corrected in various manners, as denoted at blocks 224, 226 and 232. For example, at 224, the sensing circuitry of the IMD may be managed to apply a blanking interval to the sensing circuitry to blank a sensing operation during an active field interval. The active field interval may only occur during leading and trailing transition portions of an RF or gradient field. Alternatively, the active field interval may extend over one or more gradient pulses and/or over an RF field. At 226, the IMD may modify (e.g. filter) segments of the biological signal sensed during the active field interval. At 232, the IMD may modify segments of the biological signal sensed during the active field interval, such as by applying template matching.

The block at 222 denotes situations in which i) the IMD may measure a gradient waveform derivative and/or ii) the IMD may receive gradient waveform derivative information from the MRI field monitoring device. Based on the information collected at 222, embodiments herein may implement any one or more of the correction operations at 224-233. The operations at 224, 226 and 232 are described above. At 228, the IMD may apply adaptive filtering during the active field interval. At 230, the IMD may apply real time noise correction during the active field interval.

The block at 234 denotes the situation in which the MRI scanner console may provide gradient and/or RF waveform information directly to the IMD and/or the MRI field monitor device, in which case all of the correction operations of 224-232 are available. For example, the MRI scanner may wireless convey to the IMD, the gradient waveform, slew rate and timing, or on/off. or derivative of gradient waveform. The IMD and/or the MRI field monitor device receives and noise corrects the real time biological signals and/or filters the biological signals based on slew rate (adaptive filtering). In the case where the MRI field monitor device receives and noise corrects the real time biologic signal, the noise corrected signal and/or therapy command are transmitted to the IMD.

FIGS. 2A and 2B illustrate various configurations in which external devices communicate with an IMD.

Example IMD

Figure 3:
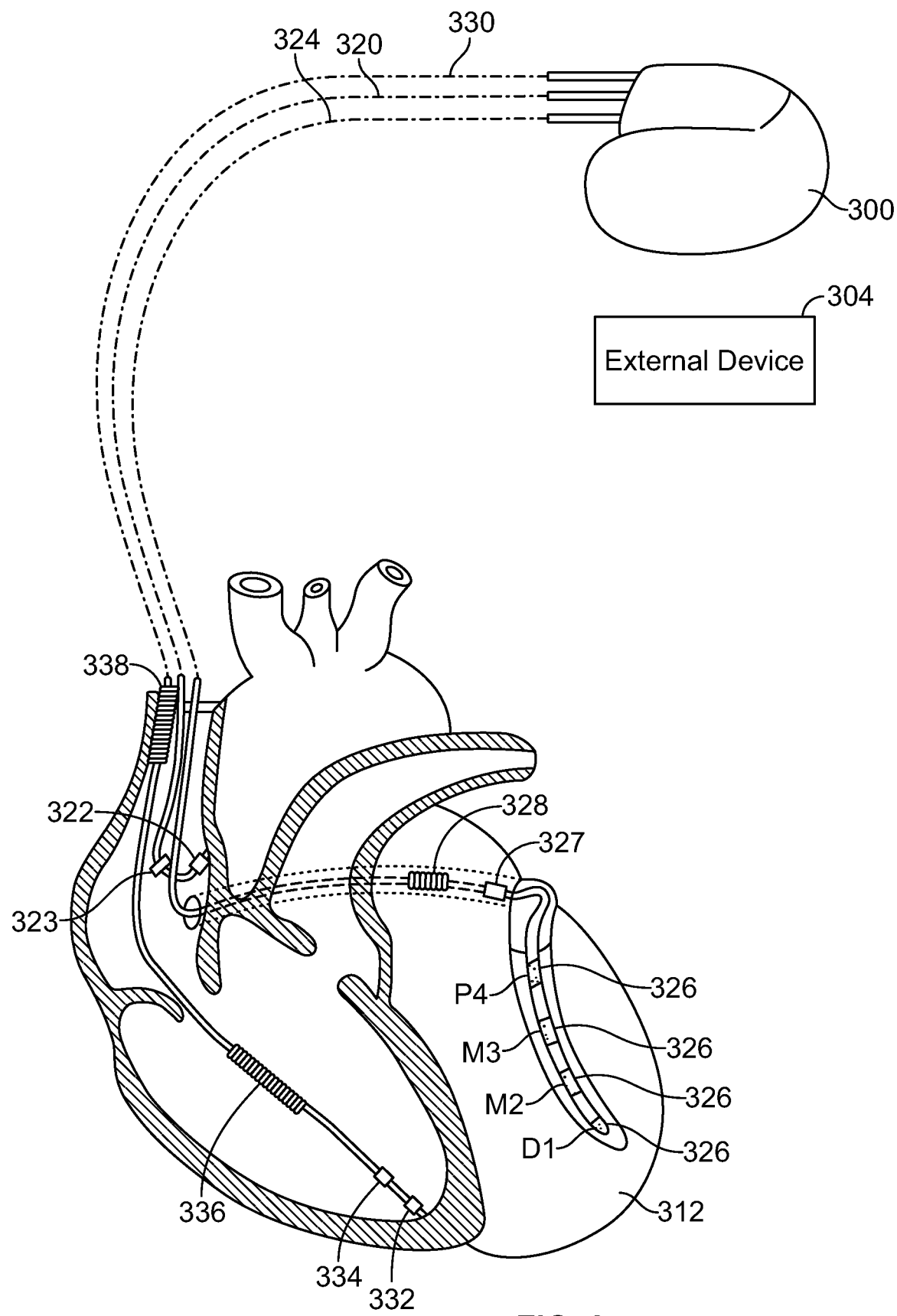
FIG. 3 illustrates an IMD and external device coupled to a heart in a patient and implemented in accordance with one embodiment.

FIG. 3 illustrates an IMD 300 and external device 304 coupled to a heart in a patient and implemented in accordance with one embodiment. The IMD 300 is one example of the type of device that may collect CA signals as biological signals. The external device 304 may be a programmer, an external defibrillator, a workstation, a portable computer, a personal digital assistant, a cell phone, a bedside monitor and the like. The IMD may represent a cardiac monitoring device, pacemaker, cardioverter, cardiac rhythm management device, defibrillator, neurostimulator, leadless monitoring device, leadless pacemaker and the like, implemented in accordance with one embodiment of the present invention. The IMD 300 may be a dual-chamber stimulation device capable of treating both fast and slow arrhythmias with stimulation therapy, including cardioversion, defibrillation, anti-tachycardia pacing and pacing stimulation, as well as capable of detecting heart failure, evaluating its severity, tracking the progression thereof, and controlling the delivery of therapy and warnings in response thereto. The IMD 300 may be controlled to sense atrial and ventricular waveforms of interest, discriminate between two or more ventricular waveforms of interest, deliver stimulus pulses or shocks, and inhibit application of a stimulation pulse to a heart based on the discrimination between the waveforms of interest and the like. Exemplary structures for the IMD 300 are discussed and illustrated in the drawings herewith.

The IMD 300 includes a housing that is joined to a header assembly that holds receptacle connectors connected to a right ventricular lead 330, a right atrial lead 320, and a coronary sinus lead 324, respectively. The leads 320, 324 and 330 measure cardiac signals of the heart. The right atrial lead 320 includes an atrial tip electrode 322 and an atrial ring electrode 322. The coronary sinus lead 324 includes a left atrial ring electrode 327, a left atrial coil electrode 328 and one or more left ventricular electrodes 326 (e.g., also referred to as P1, M1, M2 and D1) to form a multi-pole LV electrode combination. The right ventricular lead 330 includes an RV tip electrode 332, an RV ring electrode 334, an RV coil electrode 336, and an SVC coil electrode 338. The leads 320, 324 and 330 detect IEGM signals that are processed and analyzed as described herein. The leads 320, 324 and 330 also delivery therapies as described herein.

Figure 4:
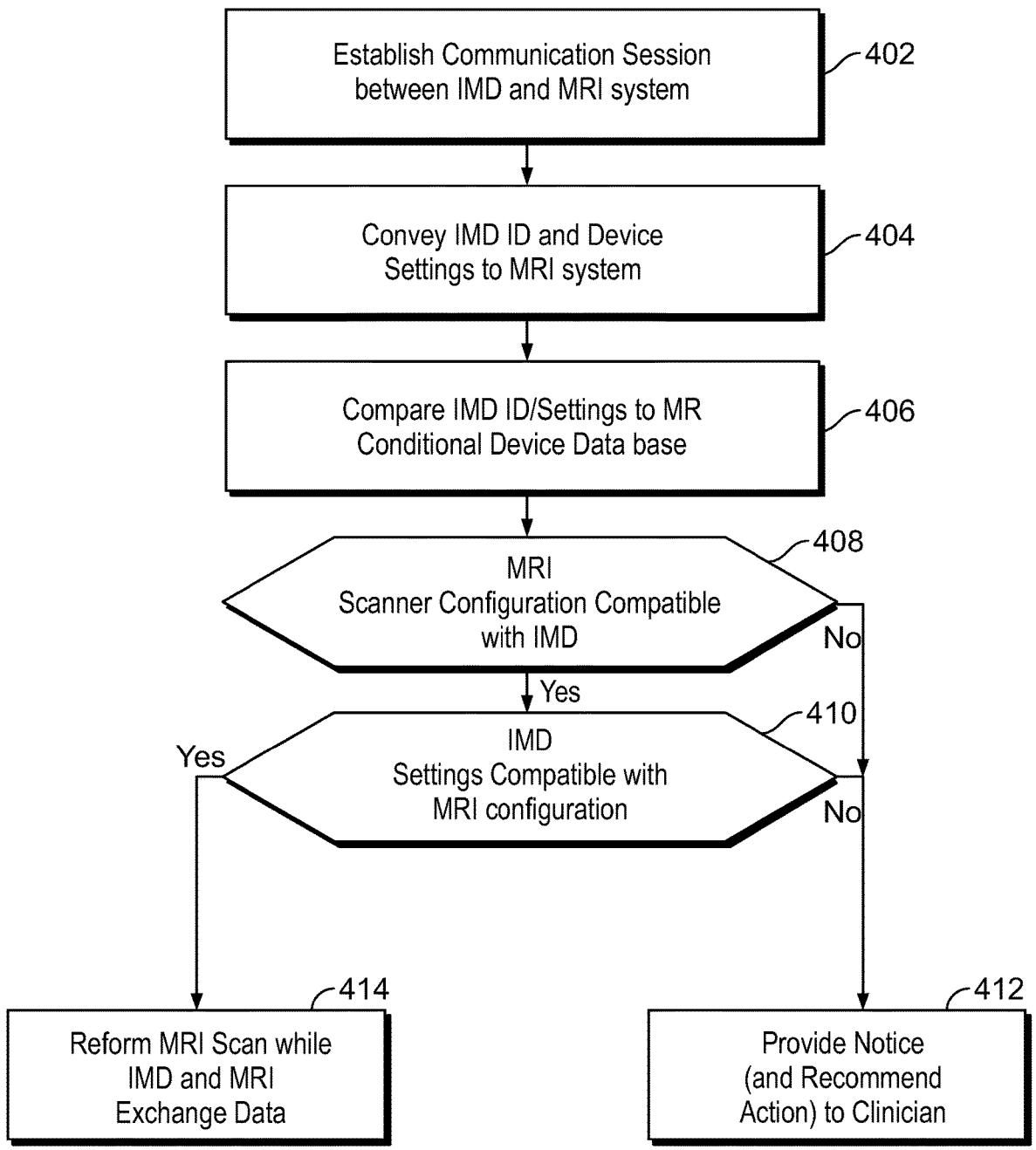
FIG. 4 illustrates a process for monitoring compatibility between an IMD and an MRI system in accordance with embodiments herein.

FIG. 4 illustrates a process for monitoring compatibility between an IMD and an MRI system in accordance with embodiments herein. At 402, the IMD and the MRI system establish a communication session with one another. By way of example, the IMD and external monitoring system may utilize the Bluetooth or Bluetooth Low Energy (BLE) protocols in connection with performing advertising and scanning operations to identify one another and exchange the appropriate information to enter a communications session.

Various wireless configurations are described to support communication between an IMD and an external device. For example, an IMD can synchronize with an external programmer through two types of communication methods, namely conductive telemetry where low-frequency pulses are used to transmit signals via the body tissue to surface mounted electrodes, and radio frequency (RF) telemetry were RF signals are transmitted out of the body via radiation. In general, the conductive tissue method does not experience any signal leaving the body, while the RF signal is intentionally transmitted out of the body.

In accordance with new and unique aspects herein, estimates have been made of the radiated signal strength (due to wireless communication from an IMD) at the RF and gradient field MRI frequencies. In connection there with, an IMD RF transmitter signal was measured near the Lamor frequencies and antenna mismatch an antenna gain were calculated to determine the IMD radiated signal strength at the MRI frequencies of the RF field and gradient field. The analysis was performed in connection with a 2 MHz bandwidth. It was found that substantially no IMD output signal radiated outside of the patient's body unless the radiating signal is mixed with the IMD transmit signal and leverages the radiation mechanism of the RF antenna in the IMD. Further, the RF antenna of the IMD was tuned to resonate only at communication frequency bands (e.g. at the 2.4 GHz frequency band associated with BLE and/or the 400 MHz bandwidth associated with MICS). Any signal outside of the intended communication band experienced high impedance mismatch and poor radiation gain. The final radiating signal level may be calculated by summing the transmit signal level, antenna mismatch and antenna gain.

Examples of different devices and corresponding radiated signal strengths are shown in Tables 1 and 2 (including the sum of TX signal level, antenna mismatch and antenna gain).

TABLE 1

| Device | Communication Band | Frequency Spectrum |
|---|---|---|
| A | MICS | 402-405 MHz |
| B | Bluetooth Smart | 2.402-2.480 GHz |
| C | Bluetooth Smart | 2.402-2.480 GHz |

TABLE 2

| | Maximum TX Level (dBm) | | Antenna Mismatch (dB) | | Antenna Gain (dB) | | Radiated Signal Level (dBm) | |
|---|---|---|---|---|---|---|---|---|
| | 64 ± 1 MHz | 128 ± 1 MHz | 64 MHz | 128 MHz | 64 MHz | 128 MHz | 64 ± 1 MHz | 128 ± 1 MHz |
| Device A | −74.5 | −74.5 | −27.6 | −5.9 | −53.7 | −40.6 | −142.7 | −121.0 |
| B | −85.5 | −84.7 | −31.4 | −28.3 | −64.2 | −53.1 | −170.0 | −166.1 |
| C | −71.7 | −70.9 | −12.4 | −10.2 | −58.5 | −45.8 | −129.9 | −126.9 |

At 404, the IMD conveys certain IMD information, such as the device model information and the device settings to the MRI system. Optionally, the MRI system may provide MRI information such as the MRI model information and/or configuration information.

At 406, one or more processors of the MRI system compare the IMD ID and/or settings to an MR conditional device database. The database includes information about various models of IMD's, along with potential settings for such models. The database includes compatibility information, such as a list of IMD models that are compatible with the current settings of the MRI system. The database may also include IMD settings/configurations that are suggested or preferred to be utilized during an MRI procedure.

At 408, the one or more processors of the MRI system determine whether the IMD model is a model that is compatible with the MRI scanner and/or current configuration of the MRI scanner. When the IMD model is not compatible, flow moves to 412. When the IMD model is compatible, flow continues to 410.

At 410, the one or more processors next determine whether the settings of the IMD are compatible with the current MRI configuration. If so, flow moves to 414. Otherwise, flow moves to 412. At 414, the one or more processors of the MRI system have confirmed that the IMD model and present settings are compatible with the MRI configuration. Accordingly, an MRI scan is performed without changing any settings of the IMD or turning off the IMD.

At 412, the one or more processors of the MRI system have determined that either the IMD model is incompatible or the present settings of the IMD are incompatible with the MRI configuration. Various actions may be taken in connection there with. For example, the MRI system may provide a notice to the clinician operating the MRI system to inform the clinician of the incompatibility. The notice may also include a recommendation for one or more actions. For example, recommendation may suggest to change the settings of the IMD (e.g. to turn on an MRI compatible mode, or to set the IMD to provide a basic level of support). Optionally, the recommendation may suggest to turn the IMD entirely off. Additionally or alternatively, the recommendations may display information to the clinician to assist the clinician in choosing the correct MRI scanner settings that are known to be compatible with the particular IMD model and IMD configuration. Additionally or alternatively, the incompatibility may be due to an aspect of the MRI configuration that can be changed, but still perform an MRI imaging sequence. For example, certain operations within an MRI imaging sequence may be turned off or "locked out", while allowing remaining operations within the MRI imaging sequence to be performed.

Figure 5:
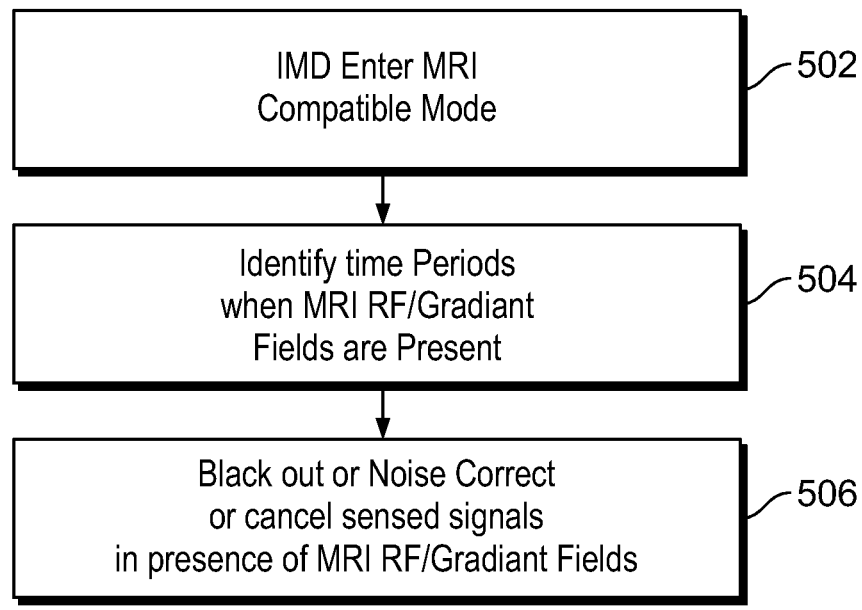
FIG. 5 illustrates a process for managing the sensing operations of an IMD while a patient is in an MRI scanner and during an MRI scanning sequence.

FIG. 5 illustrates a process for managing the sensing operations of an IMD while a patient is in an MRI scanner and during an MRI scanning sequence. The operations of FIG. 5 may be performed in connection with or separate from the process of FIG. 4.

At 502, the one or more processors of the IMD enter an MRI compatible mode. The MRI compatible mode may be automatically entered when the IMD detects the presence of an MRI scanner (e.g. Bluetooth communication or another wireless protocol). For example, with respect to the process of FIG. 4, when the IMD and MRI system establish a communication session, the IMD may enter the MRI safe mode at that time. Additionally or alternatively, a clinician may utilize the MRI system or a separate external device to convey instructions to the IMD to enter the MRI compatible mode. Additionally or alternatively, the MRI system or a separate external device may automatically detect the presence of the IMD, determine the IMD model and settings (e.g. based on a Bluetooth communications session), and automatically convey instructions to the IMD to enter an MRI safe mode.

At 504, the one or more processors of the IMD identify time periods (active field intervals) in which MRI RF fields and/or MRI gradient fields will be active/present, and/or will be in active/absent, during the MRI scanning procedure. Among other things, the one or more processors determine start times for the active field intervals for when at least one of the RF or gradient fields switch to an active state. As explained herein, during an MRI imaging sequence, the gradient field is turned on/active for short intervals (e.g. 50 ms) followed by longer pauses in which the gradient field is turned off/in active (e.g. 400 ms). As an example, the active intervals for the gradient field may be between 10 and 100 ms, or more preferably between 25 and 75 ms. The active gradient field intervals are separated by inactive intervals or lulls that may be between 250 and 750 ms.

Similarly, during the MR imaging sequence, the RF field is turned on/active for short burst intervals that may be shorter than the active intervals associated with the gradient field. The RF field burst intervals may be separated by inactive intervals that are shorter than the inactive intervals associated with the gradient field. As one example, an RF burst may be active for 5 ms.

As one example, at 504, a field detector circuit within the IMD is configured to directly detect a leading transition portion of the active field interval from at least one of the RF or gradient fields. As another example, the transceiver of the IMD is configured to receive wirelessly MRI sequence information from the an MRI field monitoring device, MRI scanner console, external controller and the like. The MRI sequence information includes the start times for the leading transition portions of the active field intervals. The one or more processors are further configured to utilize the MRI sequence information to at least one of apply a blanking interval or modify segments of the biological signal occurring during the start times (leading transition portions) for the active field intervals. Optionally, filtering may be applied in real time to the biological signals. For example, the MRI scanner may send the gradient waveform, slew rate and timing, or on/off or derivative of gradient waveform. The IMD receives and noise corrects the real time biological signals and/or filters the biological signals based on slew rate (adaptive filtering).

Additionally or alternatively, the start times for the active field intervals maybe identified continuously in real time based on active field notifications transmitted from the external device. For example, once a communications session is established, the MRI scanner (or external device communicating with the MRI scanner) may be configured to transmit a series of "active field" notifications immediately before each of the corresponding active field intervals in which the RF field is turned on/activated and/or before each active field interval in which the gradient field is turned on/activated. For example, the MRI scanner may transmit an active field notification once each second, immediately before activating the corresponding one of the RF/gradient fields for several milliseconds. The IMD maintains the communications channel in an "listen" mode to listen for the active field notifications. Each time an active field notification is received, the IMD adjust the sensing parameters accordingly as explained herein.

Additionally or alternatively, the MRI scanner may send separate types of notifications to distinguish between activation of an RF field and activation of the gradient field. For example, the MRI scanner may transmit an active RF field notification immediately before each time the RF field is turned on, and separately transmit an active gradient field notification immediately before each time the gradient field is turned on. In the foregoing manner, the IMD is able to adjust sensing parameters separately and a tailored manner relative to RF fields and gradient fields.

Once the IMD is notified that an RF or gradient field is to be activated, the IMD may turn on a timer that is configured to time out at the end of the corresponding active field interval for the RF or gradient field. For example, during initiation of the communication session, the MRI scanner may provide MRI sequence information, such as to indicate that, each time an RF or gradient field is activated, the field will remain on for X milliseconds. Based on the MRI sequence information, the IMD may configure a corresponding timer (e.g. an RF interval timer to timeout at the end of each active RF interval and a gradient interval timer to timeout at the end of each active gradient interval).

Additionally or alternatively, the IMD need not maintain an active communication session throughout the MRI procedure. Instead, the IMD may identify and manage the active RF/gradient field intervals based on MRI sequence information provided initially when a communication session is established between an IMD and an MRI system. For example, the MRI system may provide RF/gradient field timing information to the IMD. The timing information may indicate start times, durations, end times, repetition frequency, duty cycles and the like for active field intervals during which an RF field is active and/or during which a gradient field is active. The timing information may be relative to a reference point in time that is established between the IMD and the MRI scanner during the communication session. The one or more processors may start one or more timers to track active intervals for the RF/gradient fields. The active intervals for the RF and gradient fields are based on MRI sequence information that is provided by the MRI scanner.

At 506, the one or more processors manage timing circuitry within the IMD to blank out, noise correct biological signals that are sensed during the active intervals for, and in the presence of, the RF/gradient fields. RF fields and gradient fields may affect sensed biological signals to different degrees and in different manners. Accordingly, the IMD may manage the sensing process for biological signals differently in the presence of an RF field, as compared to the sensing process while in the presence of a gradient field. As a further example, the IMD may entirely blank out biological signals sensed while in the presence of a gradient field, such as when the gradient field will introduce an excessively large amount of gradient noise that cannot be corrected. However, the IMD may apply noise correction to biological signals sensed while in the presence of an RF field, such as when the RF field introduces a relatively smaller amount of RF noise that can be corrected.

Optionally, the sensed biological signal may be collected during the active interval for the RF and/or gradient fields and processed to correct for noise created by the corresponding type field. For example, the one or more processors of the IMD may maintain a look up table that includes a correction scheme associated with the MRI sequence. As a first option, the correction scheme may be used to generate appropriate filter parameters to use on the noisy biological signal. For example, the dB/dt of the gradient waveform can be used to determine an appropriate filtering frequency that would minimize attenuation of the biological signal. This filter frequency could be updated in real-time with dB/dt changes. Alternatively, as a second option, the correction scheme may be used to generate an expected noise signal which can then be removed from the noisy biological signal. For example for gradient induced noise, the expected noise is proportional to the weighted combination of all axes of the dB/dt signal. Alternatively, as a third option, the expected noise signal generated in option 2 can be combined with a clean biological template waveform to generate a biological template waveform with noise which can then be used to template match against the sensed noisy biological signal. For option 1, the correction scheme may represent a set of filter parameters that define filtering to apply to the biological signals during the active intervals. Additionally or alternatively, for option 2 the correction scheme may represent a noise signature that temporally aligned with a biological signal and subtracted from the biological signal.

For option 1 and 2, once the correction scheme is applied the MRI sequence induced noise is removed and only the biological signal remains which can then be used by the IMD to determine appropriate therapy. For option 3, template matching of the noisy biologic signal is used to discriminate between different non-physiologic states which can then be used to determine appropriate therapy.

Figure 6:
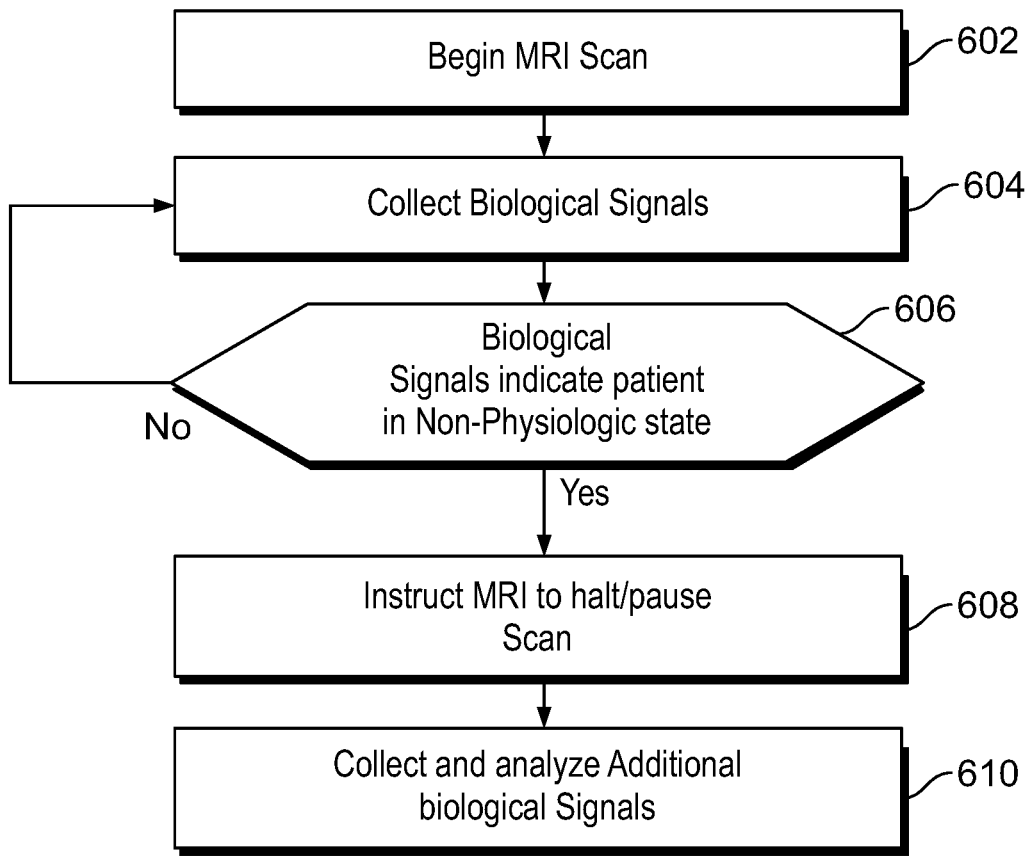
FIG. 6 illustrates a process that may be implemented to synchronize MRI data acquisition with IMD collection of biological signals in accordance with embodiments herein.

FIG. 6 illustrates a process that may be implemented to synchronize MRI data acquisition with IMD collection of biological signals in accordance with embodiments herein.

At 602, an MRI scan is initiated. At 604, during the scan, the IMD collects biological signals. At 606, the IMD analyzes the biological signals to determine whether the biological signals indicate that the patient is experiencing a non-physiologic condition. For example, an IMD that is analyzing cardiac activity signals may determine that the patient is experiencing an arrhythmia or a poor hemodynamic state. As another example, a neural stimulation IMD may determine that a patient is experiencing a seizure, significant pain and the like. A blood pressure monitor may determine that a patient's blood pressure has significantly dropped to dangerously low levels.

When the biological signals indicate that the patient is experiencing a normal physiologic condition, flow returns to 604 where additional biological signals are collected as the MRI scan continues. Alternatively, when the biological signals indicate that the patient is experiencing a non-physiologic condition, flow moves to 608.

At 608, the one or more processors of the IMD direct the transceiver to wirelessly convey a request to the MRI scanner to pause the scan for an interrupt interval. The request to pause the scan may indicate a duration for the pause. Additionally or alternatively, the MRI scanner may remain in a paused state until the IMD conveys a separate command indicating that it is okay to continue the MRI scan. Additionally or alternatively, the request may direct the MRI scanner to halt the MRI scan entirely.

At 610, during the interrupt interval, the IMD collects additional biological signals that are relatively "clean", in that the biological signals do not include any MRI interference due to RF or gradient fields. The IMD analyzes the biological signals that are collected in the absence of MRI interference in accordance with normal operation of the IMD.

Additionally or alternatively, the IMD may monitor for potential fault conditions within the IMD and/or a lead. For example, the IMD may include temperature sensors to track a temperature within the IMD and/or at various points along a lead. When the detected temperature rises above a certain threshold, the IMD may convey a halt request to the MRI scanner.

ID 60844

Next the discussion turns to methods and systems for managing communication between an IMD and external device during an MRI scan in the presence of RF and gradient fields.

Figure 7:
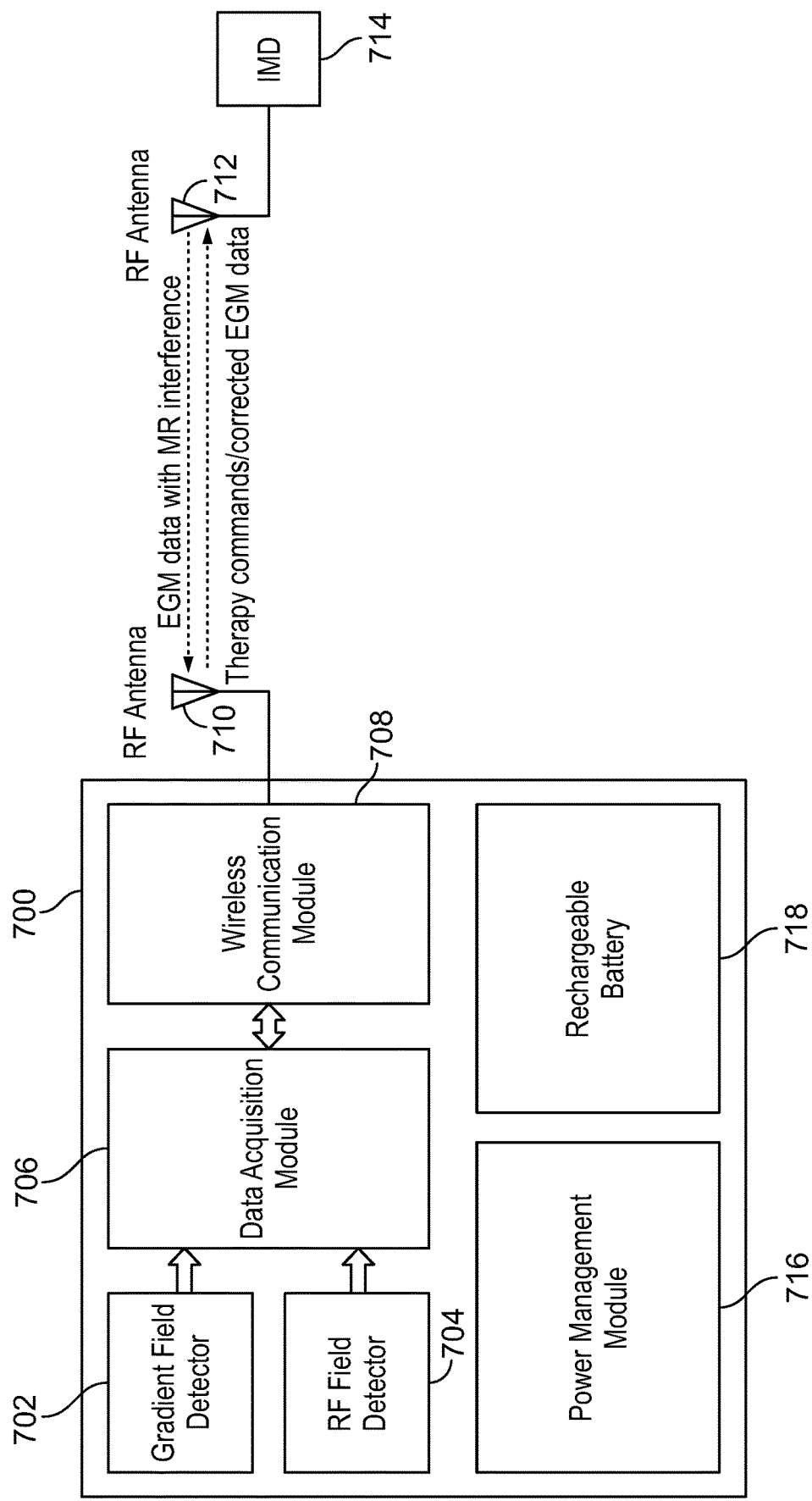
FIG. 7 illustrates a functional block diagram of the components forming an MRI field monitoring device formed in accordance with embodiments herein.

FIG. 7 illustrates a functional block diagram of the components forming an MRI field monitoring device 700 formed in accordance with embodiments herein. The MRI compatible MRI field monitoring device 700 may be provided as a standalone unit or integrated into the MRI scanner console.

The MRI field monitoring device 700 includes an antenna 710 coupled to a wireless communications module 708 that are configured to wirelessly communicate with an IMD 714 through an antenna 712. The communications module 708 may include a transceiver and/or separate transmitters and receivers to facilitate communication. The antenna 710 is generally located within the same room as the MRI scanner to facilitate wirelessly communicate with the IMD 714.

The MRI field monitoring device 700 includes a gradient field detector circuit 702 and/or an RF field detector circuit 704. The MRI field monitoring device 700 also includes a data acquisition module 706. The data acquisition module 706 and the gradient and/or RF detector circuits 702, 704 cooperate to accurately acquire gradient and RF field information from the MRI scanner, respectively. The gradient and RF field detector circuits 702, 704 are positioned outside, but proximate to, an opening of the MRI bore of the MRI scanner to facilitate acquisition of gradient and RF fields. As nonlimiting examples, the gradient and RF field detector circuits 702, 704 may be positioned 5 cm to 50 cm, or more preferrable up to 20 cm, from an edge of the MRI bore. The gradient and RF field detector circuits 702, 704 are positioned close enough to the MRI bore to detect the gradient and RF fields, but far enough away from an edge of the MRI bore to avoid detuning the MRI coils. Optionally, the gradient and RF field detector circuit 702, 704 may be constructed from non-magnetic materials to avoid interaction with the MR static magnetic field.

For example, the MR gradient field detector circuit 702 includes a 3-axis loop tuned to have sensitivity to AC fields having a frequency between 500 Hz and 5 kHz and having a field strength between 3.5 T and 50 mT with a field strength resolution of 1 mT. The gradient field detector circuit 702 may further include an analog front-end IC with a sampling rate of at least 1 MS/s.

The RF field detector circuit 704 includes as loop antenna and an RF sampling receiver. The loop antenna has an electrically small size tuned to detect an RF magnetic field of up to 1 µT. The loop antenna is tuned to detect an RF magnetic field having a center frequency of approximately at least one of 64 MHz or 128 MHz. The RF sampling receiver may utilize a sampling rate of at least 500 MS/s (Mega Sample per second).

The data acquisition (DA) module 706 includes memory configured to store program instructions and one or more processors configured to execute the program instructions. The one or more processors, when executing program instructions, are configured for digitizing, filtering, storing and processing the raw RF/gradient field data detected by the RF and gradient field detector circuits 702,704, as well as biological signals received from the IMD. The RF and gradient field data are indicative of RF and gradient fields generated by the MRI scanner during the MR scanning sequence. For example, the data acquisition module 706 may include a real-time DSP (digital signal processor) that is configured to implement RF and gradient filters to detect RF and gradient magnetic field signals. The data acquisition module 706 is configured to perform real-time filtering of the gradient and RF signals that are sampled and output by the gradient and RF field detector circuits 702, 704, respectively.

In accordance with embodiments herein, the DA module 706 periodically or continuously analyzes the data output by the gradient and RF field detector circuits 702, 704, for one or more criteria indicating that a gradient or RF field has transitioned from an inactive state to an active state or vice versa. Based on the analysis of the RF or gradient field data, the DA module 706 identifies a start time corresponding to each active field interval when the RF or gradient fields iteratively switch to the active state. Over the course of an MRI scanning sequence, a series of active field intervals occur for the RF and/or gradient fields. Accordingly, the DA module 706 analyzes the RF and gradient field data over the course of the MRI scanning sequence to determine a series of start times for the corresponding active field intervals when the RF and/or gradient fields iteratively switch to the active state.

By way of example, the processor of the DA module 706 may define a gradient field search window that occurs at predetermined intervals (e.g., 1 second intervals). During each gradient field search window, the DA module 706 analyzes the content of the gradient field data to determine whether a gradient pulse is present or more specifically to identify a leading transition portion and/or a trailing transition portion of the gradient pulse. When a gradient pulse is detected (e.g., a leading transition portion), the processor sets a gradient ON flag and directs the communications module 708 to transmit an active field notification (e.g. a gradient ON flag/message) to the IMD.

Additionally or alternatively, the processor of the DA module 706 defines an RF field search window that occurs in predetermined intervals (e.g., 1 second intervals). The DA module 706 determines whether an RF pulse is present/detected during the RF field search window or more specifically a leading transition portion of an active field interval of an RF field. When a RF burst is detected, the processor sets an RF ON flag and directs the communications module 708 to transmit an RF ON flag/message to the IMD.

A wireless communications module 708 is coupled to an antenna 710 and operates to send the gradient and RF field information (e.g. gradient ON flag, RF ON flag) to the IMD 714 via a wireless communication link between antennas 710 and 712. The IMD is configured to convey biological signals to the MRI field monitoring device 700 between antennas 712 and 710. The MRI field monitoring device 700 is configured to receive the sensed biological signals from the IMD and process the sensed signals using the gradient/RF field information to correct for noise within the sensed biological signals.

The biological data received from the IMD 714 may include among other things, the raw biological signals sensed by the IMD. Additionally, the biological data may further include device markers denoting characteristics of interest identified by the IMD within the biological signals, as well as any non-physiologic conditions declared by the IMD based on the biological signals. For example, when the IMD represents an implantable cardiac monitor, pacemaker, ICD, CRM device, leadless pacemaker, subcutaneous cardiac stimulation device and the like, the IMD may detect, as biological signals, cardiac activity (CA) signals over one or more sensing channels. The IMD may then transmit the CA signals, device markers, arrhythmia identifiers and the like to the communications module 708.

The DA module 706 may process the biological signals, such as to remove noise from the biological signals introduced due to the MRI field. For example, the DA module 706 may process the biological signals through filtering and/or canceling/blanking out segments of the biological signal that occur contemporaneous in time with the gradient and/or RF fields, to produce MRI-induced-noise corrected (MRI-INC) biological signals. For example, in accordance with some embodiments, when the biological signals correspond to EGM signals, the EGM signal will have noisy EGM (N-EGM) segments prior to correction. The DA module 706 will process the noisy EGM signals to form noise corrected EGM (NC-EGM) signals. For example, the noise may be removed from the EGM signals and/or the noisy EGM segment may be blanked. The DA module 706 may then analyze the MRI-INC biological signals for one or more non-physiologic conditions. For example, in connection with cardiac monitoring and/or cardiac therapies, the DA module 706 may apply the same or similar arrhythmia detection algorithms to CA signals as applied by an IMD 714. In connection with neural stimulation applications, the DA module 706 may apply the same or similar neural detection algorithms to neural signals as applied by a neural stimulation IMD 714.

Additionally or alternatively, the DA module 706 may return the MRI-INC biological signals to the IMD 714, such as to allow the IMD 714 to record the MRI-INC biological signals for subsequent telemetry to a medical network that maintains the patient's records and are reviewed by the patient's regular doctor. The IMD 714 may further analyze the MRI-INC biological signals in accordance with normal operation of the IMD 714, separate from or during the MRI procedure, to determine whether the patient is experiencing a non-physiologic condition (e.g. an arrhythmia that should be treated). The IMD 714 is then allowed to act upon the received gradient/RF field information.

Additionally or alternatively, the MRI field monitoring device 700 may receive, from the IMD, communications in response to the gradient and RF field information, as well as other general IMD operational and status information, including parameters related to the present type of therapy to be delivered.

The MRI field monitoring device 700 is further configured to display information related to responses from the IMD. The MRI field monitoring device 700 acquires and processes the gradient/RF field signals in real time, during an MRI procedure, and more specifically during the short periods of time in which the gradient/RF fields are present. In real time, the MRI field monitoring device 700 also conveys field the information in a timely manner sufficient to allow IMD to allow the IMD to sensed biological signals that may include MR field interference and/or adjust sensing parameters in accordance there with.

Optionally, the MRI field monitoring device 700 may further include a power management module 716 configured to recharge a rechargeable battery 718.

Figure 8:
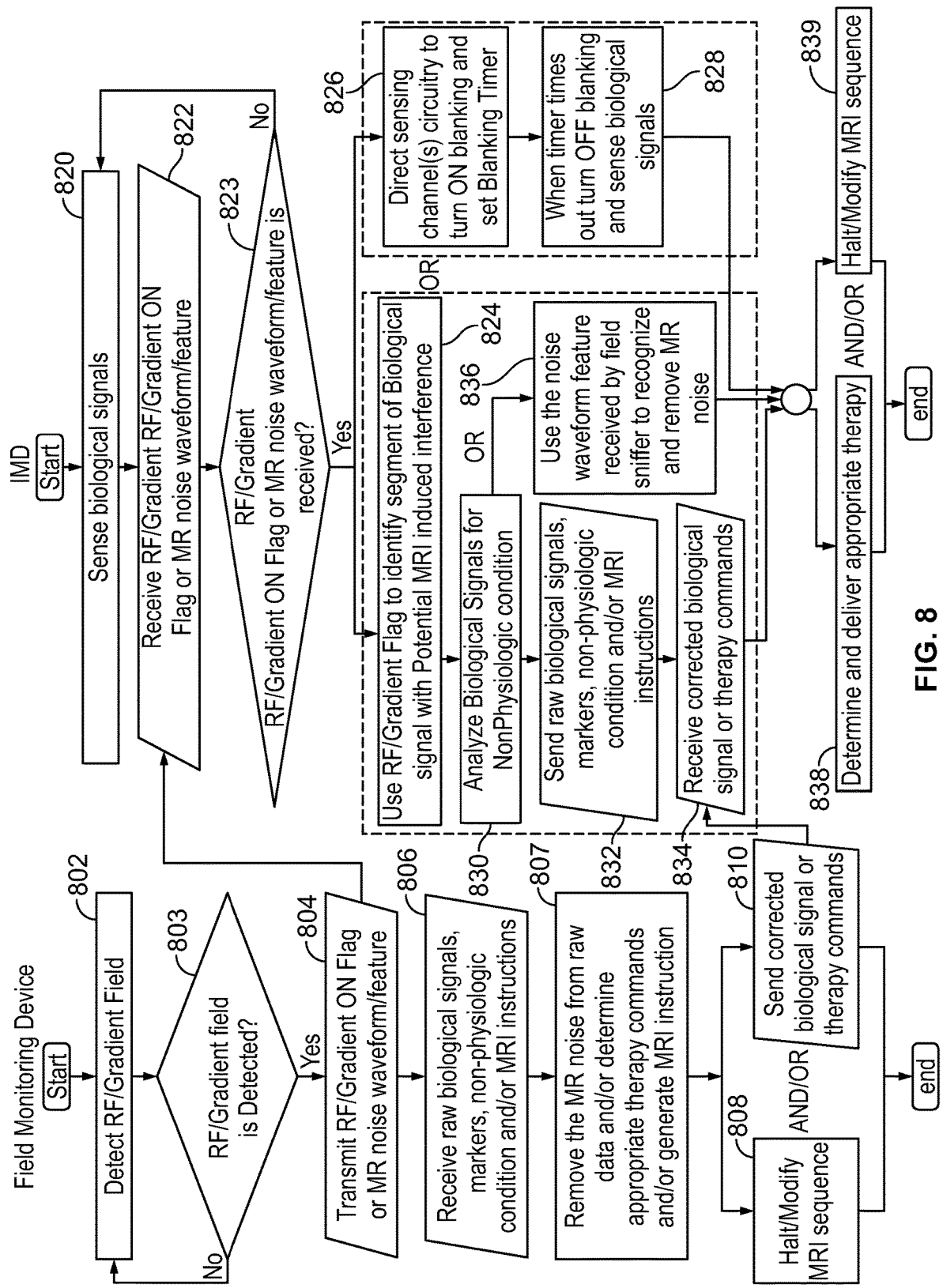
FIG. 8 illustrates a process flow diagram for operations implemented by the MRI field monitoring device and IMD in accordance with embodiments herein.

FIG. 8 illustrates a process flow diagram for operations implemented by the MRI field monitoring device and IMD in accordance with embodiments herein. The left column generally illustrates operations implement it by the MRI field monitoring device, while the right column generally illustrates operations and permitted by the IMD.

At 802, the MRI field monitoring device detects the MRI fields generated by the MRI scanner, and at 803 identifies when an RF field and/or gradient field is detected.

At 804, when the MRI field monitoring device detects an RF or gradient field, the MRI field monitoring device sets and transmits (to the IMD) an RF ON flag and/or gradient ON flag, or MR noise waveforms/features. The operations at 802-804 are iteratively repeated, such as every second or more frequently.

In parallel, at 820, the IMD senses biological signals. At 822, the transceiver of the IMD receives the RF or gradient ON flag or MR noise waveforms/features. At 823, the IMD determines whether an RF/gradient on flag or MRI noise waveform/feature is received. If not, flow returns to 820. If so, flow may branch to 824 and/or 826. The IMD may change operation, based on the RF or gradient ON flags or MR noise waveforms/features in one or more manners. For example, at 824, one or more processors of the IMD use the ON flag to identify a beginning of a segment of the biological signals that will potentially include MRI induced interference. The duration of the biological signal segment that includes potential MRI induced interference may be predetermined. For example, during the initial communication between the MRI scanner and the IMD, information about the MRI sequence may be provided to the IMD indicating a duration of each RF field interval and/or a duration of each gradient field interval. Optionally, the durations of the RF and gradient field intervals may be preprogrammed. Optionally, the field monitoring device may transmit RF OFF flags and gradient OFF flags at the end of each RF and gradient field burst. Once the segment of the biological signal (that includes potential MRI interference) is identified, the IMD may apply a correction, such as applying a filter, subtracting a template and the like.

Additionally or alternatively, at 826, when and RF/gradient ON flag is detected, the one or more processors may direct circuitry of one or more sensing channels to turn on a blanking interval and to set a blanking timer. When the blanking interval is turn on, the circuitry the sensing channel does not "listen to" or collect biological signals. At 828, when the blanking timer times out, the circuitry of the sensing channel is reactivated and again begins to collect biological signals. The blanking timer may be set based on information known about the MRI sequence and/or set to a predetermined value (e.g. 20 ms). Optionally, instead of using a blanking timer, the sensing circuitry may remain in a blanking state until the IMD receives an RF OFF flag and/or gradient OFF flag from the field monitoring device.

The operations at 802-804 and at 820-828 are continuously repeated, such that the field monitoring device repeatedly transmits RF/gradient ON flags and the IMD repeatedly turns the blanking interval on and off.

At 830, the one or more processors of the IMD analyze the biological signals for one or more non-physiologic conditions. It is recognized that the portion of the biological signals analyzed may extend over a much longer period of time than the interval between the operations at 802-828. For example, the operations at 820-828 may be repeated every few hundred milliseconds, whereas the analysis at 830 analyzes biological signals collected over one minute or over a longer period of time when determining whether a non-physiologic condition is present. Flow moves from 830 to 832 and 836. At 836, optionally, the IMD may use the noise waveform features received by the MRI field monitoring device to recognize and remove MRI induced noise.

At 832, the IMD transmits various information to the field monitoring device. For example, the IMD may transmit the raw (noisy) biological signals alone or in combination with markers inserted by the IMD in connection with the analysis at 830. Additionally or alternatively, the IMD may transmit the determination of the non-physiologic condition determined at 830.

Additionally or alternatively, the IMD may transmit an MRI instruction that is derived based on the analysis at 830. For example, when the analysis at 830 identifies that a patient is experiencing an arrhythmia, the MRI instruction transmitted from the IMD may direct the MRI scanner to pause or halt the MRI scan.

At 806, the field monitoring device receives the information transmitted from the IMD, such as the raw biological signals, markers, non-physiologic condition and/or MRI instructions. At 807, the field monitoring device removes the MRI noise from the raw biological signals and/or determines appropriate therapy commands. Additionally or alternatively, the field monitoring device may generate MRI instructions. At 808, the field monitoring device determines whether it is appropriate to hold or modify the MRI sequence based on the information received from the IMD. For example, the MRI scanner may halt or change one or more aspects of the MRI sequence when a patient is determined to be experiencing an arrhythmia. Additionally or alternatively, at 810, the field monitoring device may send and/or therapy commands back to the IMD. The IMD receives corrected biological signal or therapy commands at 834.

The foregoing operations are iteratively repeated. Throughout operation, at 838, the IMD may determine and deliver an appropriate therapy. Additionally or alternatively, at 839, the IMD may determine to halt/modify the MRI sequence.

The process of FIG. 8 assumes that the MRI scanner and IMD are able to maintain a continuous communications session throughout the MRI scan. While a MICS and/or BLE communication session is maintained throughout the scan, the foregoing operations do not unduly impact the battery longevity. For example, if a patient undergoes a 30 minute MRI scan once each year throughout the battery lifespan, it is estimated that the foregoing process will only shorten the battery longevity by approximately less than one-half year (e.g., 0.44 years).

The foregoing operations are described in connection with detecting RF fields and gradient fields. Optionally, the foregoing detection operations may further include the detection of the static field strength. For example, higher static field strengths may impact and appearance of an intra-electrocardiogram (IEGM) signal at a sensing channel of an IMD, as well as impact how to process the results.
ID 60986

Next the discussion turns to methods and systems that utilize a secondary sensor to monitor a patient's physiologic condition during an MRI scanning sequence alone or in combination with the types of biological sensors described elsewhere herein. In accordance with embodiments herein, an optical photoplethysmography (PPG) sensor may be built into the IMD as a source to collect hemodynamic information as a secondary hemodynamic marker. In accordance with embodiments herein, the IMD and methods determine when a communication session can be maintained between the IMD and the external device during the MRI procedure and in the presence of the MRI scanning sequence. The IMD and methods select between first and second sensing modes based on the determination. When in the first sensing mode, the IMD and methods turn on the sensing circuitry to sense the biological signals and the PPG sensor to sense PPG signals both during the MRI scanning sequence. When in the second sensing mode, the IMD and methods turn off the sensing circuitry to prevent sensing of the biological signals during the MRI scanning sequence and turn on the PPG sensors to sense PPG signals during the MRI scanning sequence. The IMD and methods analyze at least one of the biological signals or PPG signals for an indication that a patient is experiencing a non-physiologic condition.

Figure 9:
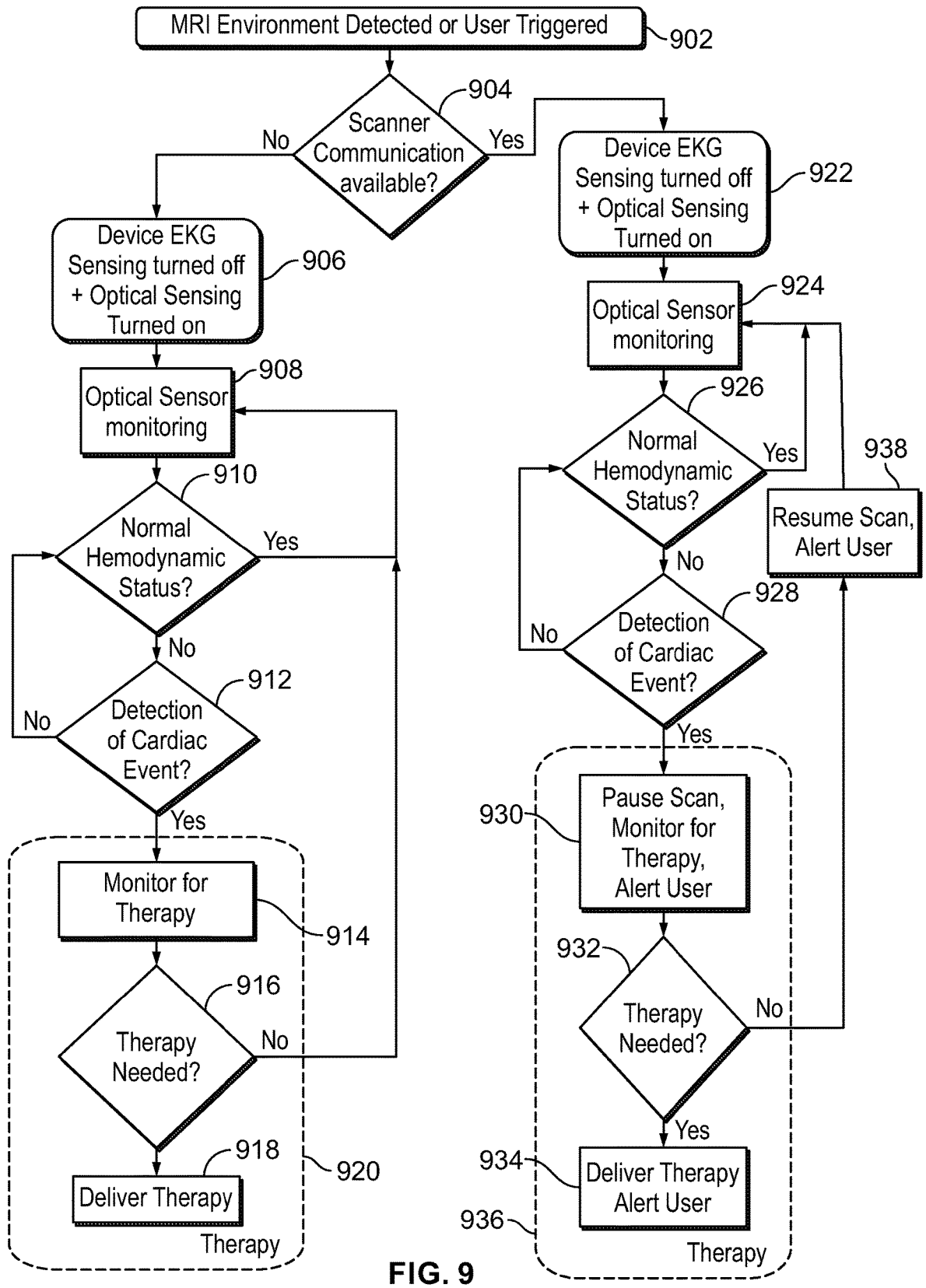
FIG. 9 illustrates a process for operating an IMD in the presence of the MRI scanning sequence in accordance with embodiments herein.

FIG. 9 illustrates a process for operating an IMD in the presence of the MRI scanning sequence in accordance with embodiments herein. At 902, one or more processors of the IMD trigger an MRI mode based on detection by the IMD of an MRI environment and/or a user instruction from an external device. At 904, the IMD and/or MRI scanner determine whether the IMD and the MRI scanner can at least open and/or maintain a communication session during the MRI procedure. The determination may be made based on various criteria. For example, IMD and MRI scanner can undergo a handshake protocol to exchange communication information which can be initiated by the user or auto-triggered in presence of MRI fields. Alternatively, the determination may be made based on a comparison of the model and settings of the IMD relative to the type and settings of the MRI system. Additionally or alternatively, the determination may be done via some a handshake protocol between the IMD and MRI scanner equipment or between the IMD and the MRI scanner console computer. For example, the handshake protocol may simply need to confirm that a communication channel is available. Additionally or alternatively, a preliminary test/scout scan may be implemented by the MRI scanner while the IMD attempts to communicate with the external device in order to determine whether a communication session may be reliably maintained (e.g without an excessive number of drops in the communication session, errors, unduly high signal-to-noise ratio, etc.). If it is determined that a communication session cannot be reliably maintained, flow moves to 906. If it is determined that a communication session can be reliably maintained, flow moves to 922.

At 906, the one or more processors of the IMD turn off the sensing circuitry for collecting biological signals and turn on an optical PPG sensing circuit coupled to an optical PPG sensor. At 908, the optical PPG sensor collects PPG signals. At 910, the one or more processors analyze the PPG signals to determine whether a patient is experiencing a normal or abnormal hemodynamic state. If the patient is in a normal hemodynamic state 910, flow returns to 908 where additional PPG signals is collected. At 910, when the one or more processors determine that the patient is experiencing an abnormal hemodynamic state, flow moves to 912. At 912, the one or more processors determine whether a significant cardiac event of interest or other significant abnormal hemodynamic event of interest (e.g. a heart attack, ventricular fibrillation, ventricular tachycardia, cardiac pause, substantial drop in blood pressure, substantial drop in a BGA) was detected by the IMD. For example, at 912, the one or more processors may determine whether the heart rate exceeds an upper threshold (e.g. 120 bpm), the heart rate variability exceeds a threshold, the blood pressure drops below a threshold, a diabetic patients electrolyte levels drop below a threshold, a patient susceptible to seizures experiences neurological signals indicating a potential or the beginning of a seizure and the like.

At 912, wherein the one or more processors determined that no cardiac, hemodynamic or other physiologic condition of interest exist or exceeds a threshold, flow returns to 910. When a cardiac event, hemodynamic or other physiologic condition of interest exist or exceeds a threshold, flow moves to a therapy subprocess generally denoted at 920. At 914 the one or more processors performance a therapy monitoring operation, such as to collect additional PPG signals and/or secondary data. At 916, the one or more processors determine whether therapy is needed, and if so, therapy is delivered at 918. If therapy is not needed at 916, flow returns to 908 where the PPG sensor collects new PPG signals. It should be recognized that each iteration through the optical sensor monitoring at 908 collects PPG signals for a relatively short periods of time (e.g. 10-200 ms), whereas the analysis at 910-914 may be based on PPG signals collected over a longer period of time (e.g., 5-10 heartbeats, 30 seconds, five minutes).

Returning to 904, when the IMD, MRI scanner and environment can sustain a communication session during the MRI procedure, flow moves to 922. The operations from 922-938 are relatively similar to the operations at 906-920. At 922, the one or more processors of the IMD turn off the sensing circuitry for collecting biological signals and turn on optical sensing circuitry coupled to an optical PPG sensor. At 924, the optical PPG sensor collects PPG signals. At 926, the one or more processors analyze the PPG signals to determine whether a patient is experiencing a normal or abnormal hemodynamic state. For example, the PPG signals may be used to monitor the patients heart rate and heart rate variability. If the patient is in a normal hemodynamic state at 926, flow returns to 924 where additional PPG signals are collected. At 926, when the one or more processors determine that the patient is experiencing an abnormal hemodynamic state (e.g., undesired variation in heart rate), flow moves to 928. At 928, the one or more processors determine whether a cardiac event was detected by the IMD. If not, flow returns to 926. When a cardiac event is detected at 926, flow moves to a therapy subprocess generally denoted at 936. At 930, the one or more processors transmit an instruction to the MRI scanner to pause the MRI procedure and to alert the user. The one or more processors then perform a therapy monitoring operation, such as to collect additional PPG signals and/or secondary data, while the MRI scan has been halted. By way of example, once the MRI scan has been halted, the IMD may also turn on the biological sensing circuitry to collect biological signals (e.g. IEGM signals) for further analysis. At 932, the one or more processors determine whether therapy is needed, and if so, therapy is delivered at 934. If therapy is not needed at 932, flow moves to 938 where a scan is resumed and the user is alerted. Thereafter, flow returns to 924 where the PPG sensor collects additional PPG signals. It should be recognized that each iteration through the optical sensor monitoring at 924 collects PPG signals for relatively a short period of time (e.g. 10-200 ms), whereas the analysis at 926-930 may be based on PPG signals collected over a longer period of time (e.g., 5-10 heartbeats, 30 seconds, five minutes).

Figure 10:
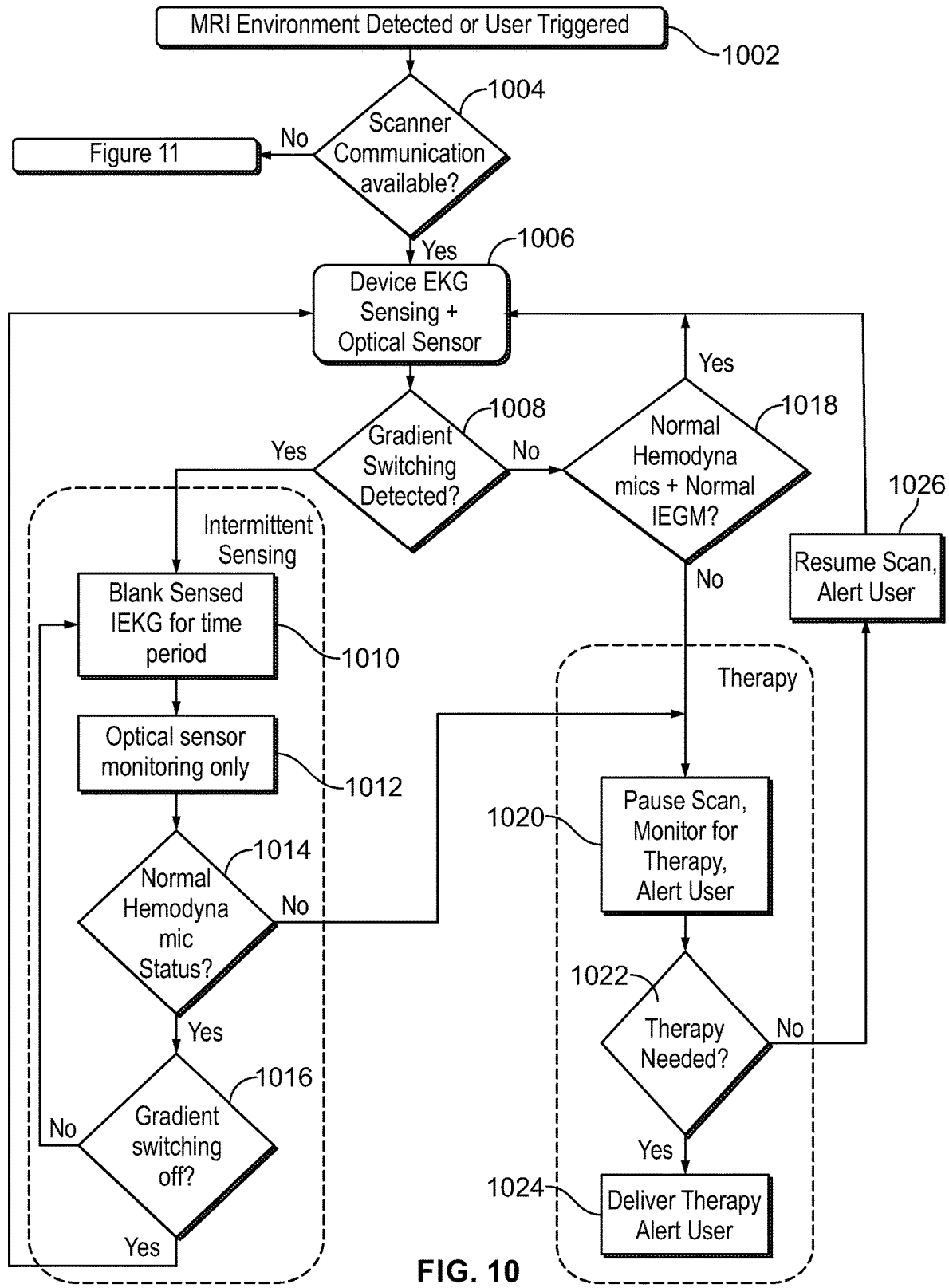
FIG. 10 illustrates a process for operating an IMD in the presence of an MRI scan in accordance with embodiments herein.
Figure 11:
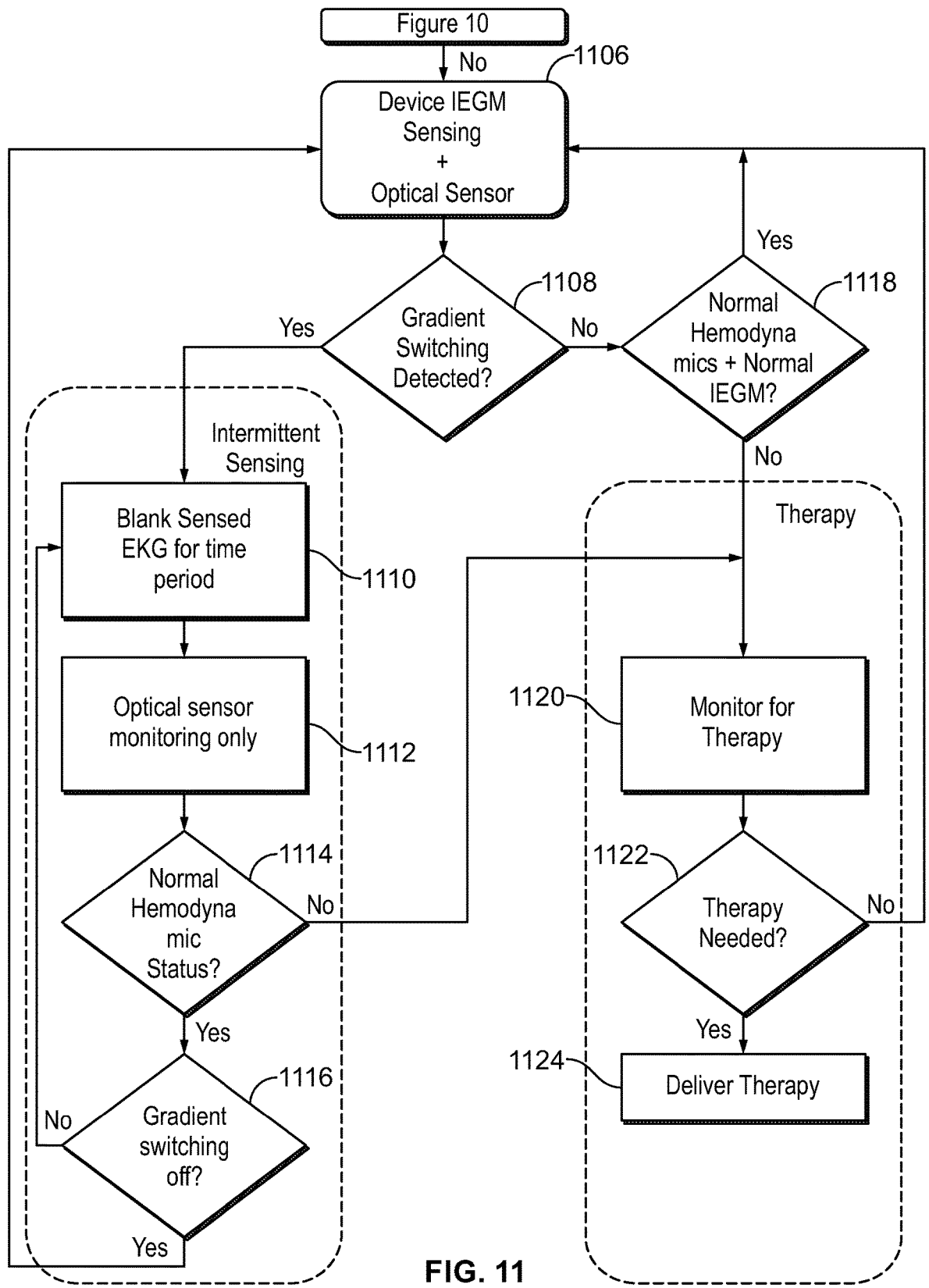
FIG. 11 illustrates a process for operating an IMD in the presence of an MRI scan in accordance with embodiments herein.

FIGS. 10 and 11 illustrate a process for operating an IMD in the presence of an MRI scan in accordance with embodiments herein. The process of FIGS. 10 and 11 are implemented with an IMD that includes internal components that are configured to detect RF and gradient fields and, optionally to detect more specifically leading and/or trailing transition portions between active and inactive field states. At 1002, one or more processors of the IMD trigger an MRI mode based on various criteria as discussed herein. At 1004, the IMD and MRI scanner determine whether the IMD and the MRI scanner can at least open and/or maintain a communication session during the MRI procedure. If not, flow moves to the process of FIG. 11. If so, flow moves to 1006.

At 1006, the one or more processors of the IMD turn ON the sensing circuitry for collecting biological signals and turn ON an optical sensing circuit coupled to an optical PPG sensor. At 1006, the optical PPG sensor begins/continues to collect PPG signals and the biological sensing circuitry begins/continues to collect biological signals.

At 1008, the one or more processors of the IMD collect and analyze signals detected by the various coils and RF/gradient detection circuitry. The one or more processors determine when RF/gradient fields and leading/trailing transition portions are present. When RF and/or gradient fields are present, flow moves to 1010. When RF and/or gradient fields are not present, flow moves to 1018.

At 1010, the one or more processors apply a blanking interval to the sensing circuitry to blank a sensing operation during at least a leading transition portion of the active feel interval of the corresponding RF or gradient field. The blanking interval is maintained for a predetermined period of time.

At 1012, the one or more processors perform optical sensor monitoring only, in that the PPG signals are collected, while the biological signal sensing circuitry is maintained in a blanking condition and does not collect biological signals. At 1014, the one or more processors analyze the PPG signals to determine whether a patient is experiencing a normal or abnormal hemodynamic state (e.g., variation in heart rate is below a threshold). If the patient is in a normal hemodynamic state, flow moves to 1016. At 1016, the one or more processors analyze signals from the field detection circuitry determine whether the active field interval of the RF or gradient field has switched off (e.g. transitioned to an inactive state). When the RF or gradient field remains on, flow returns to 1010, where the operations at 1010-1016 are repeated while the biological signal sensing circuitry is maintained in the blanking state. When the RF or gradient field is switched off, flow returns to 1006, where the sensing circuitry for biological signals is turned on again.

Returning to 1008, when the field detection circuitry determines that the RF or gradient fields or in active, flow moves to 1018. At 1018, the one or more processors determine whether the patient is experiencing an abnormal hemodynamic state based on the biological signals and the PPG signals. When the patient is in a normal hemodynamic state, flow returns to 1006 where the biological signal sensing circuitry and the PPG sensing circuitry remain on. Alternatively, at 1018, when it is determined that the patient is in an abnormal hemodynamic state, based on one or both of the biological and PPG signals, flow moves to 1020.

At 1020, the one or more processors direct the transceiver to transmit a request to the external device for the MRI scanner to pause or halt the MRI procedure and/or a request to alert the clinician of a potential non-physiologic condition. At 1020, the one or more processors manage the sensing circuitry to collect additional biological signals, and optionally additional PPG signals.

At 1022, the one or more processors determine whether therapy is needed, and if so, therapy is delivered at 1024 and a user alert is conveyed to the external device. If therapy is not needed at 1022, flow moves to 1026. At 1026, the one or more processors direct the transceiver to transmit a request to resume scanning and/or to alert the clinician that therapy was not needed. Thereafter, flow returns to 1006 and the process is repeated.

Returning to FIG. 11, FIG. 11 illustrate a process for operating an IMD in the presence of an MRI scan when the system and environment are unable to support a communication session during the MRI procedure.

At 1106, the one or more processors of the IMD turn ON the sensing circuitry for collecting biological signals and turn ON an optical sensing circuit coupled to an optical PPG sensor. At 1106, the optical PPG sensor begins/continues to collect PPG signals and the biological sensing circuitry begins/continues to collect biological signals.

At 1108, the one or more processors of the IMD collect and analyze signals detected by the various coils and RF/gradient detection circuitry. The one or more processors determine when RF/gradient fields and leading/trailing transition portions are present. When RF and/or gradient fields are present, flow moves to 1110. When RF and/or gradient fields are not present, flow moves to 1118.

At 1110, the one or more processors apply a blanking interval to the sensing circuitry to blank a sensing operation during at least a leading transition portion of the active feel interval of the corresponding RF or gradient field. The blanking interval is maintained for a predetermined period of time.

At 1112, the one or more processors perform optical sensor monitoring only, in that the PPG signals are collected, while the biological signal sensing circuitry is maintained in a blanking condition and does not collect biological signals. At 1114, the one or more processors analyze the PPG signals to determine whether a patient is experiencing a normal or abnormal hemodynamic state (e.g., variation in heart rate is below a threshold). If the patient is in a normal hemodynamic state, flow moves to 1116. At 1116, the one or more processors analyze signals from the field detection circuitry determine whether the active field interval of the RF or gradient field has switched off (e.g. transitioned to an inactive state). When the RF or gradient field remains on, flow returns to 1110, where the operations at 1110-1116 are repeated while the biological signal sensing circuitry is maintained in the blanking state. When the RF or gradient field is switched off, flow returns to 1106, where the sensing circuitry for biological signals is turned on again.

Returning to 1108, when the field detection circuitry determines that the RF or gradient fields or in active, flow moves to 1118. At 1118, the one or more processors determine whether the patient is experiencing an abnormal hemodynamic state based on the biological signals and the PPG signals. When the patient is in a normal hemodynamic state, flow returns to 1106 where the biological signal sensing circuitry and the PPG sensing circuitry remain on. Alternatively, at 1118, when it is determined that the patient is in an abnormal hemodynamic state, based on one or both of the biological and PPG signals, flow moves to 1120.

At 1120, the one or more processors collect additional PPG signals in connection with monitoring for therapy.

At 1122, the one or more processors determine whether therapy is needed, and if so, therapy is delivered at 1124 and a user alert is conveyed to the external device. If therapy is not needed at 1122, flow returns to 1106, where the process is repeated.

The processes of FIGS. 9-11 facilitate coordinated collection of biological and PPG signals, as well as directions from the IMD to pause and MRI procedure, to confirm or deny that a patient is experiencing a non-physiologic condition.

Figure 12:
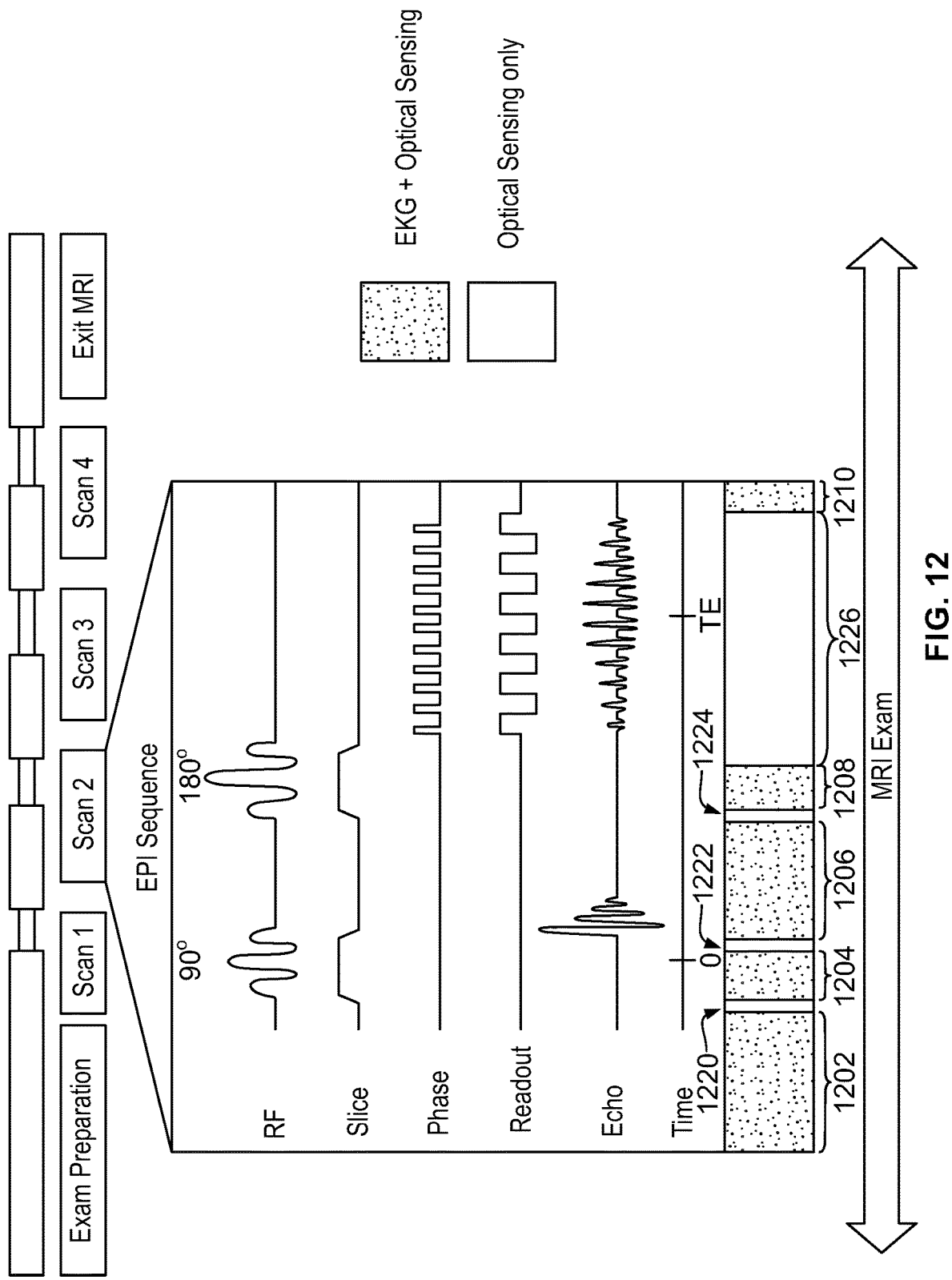
FIG. 12 illustrates an example of when biological and PPG signals may be collected during a scan phase of an MRI procedure.

FIG. 12 illustrates an example of when biological and PPG signals may be collected during a scan phase of an MRI procedure. FIG. 12 illustrates an example of the scanning sequence during scan 2 where intervals 1202-1210 represent. The time in which both biological and PPG signals are collected. Intervals 1220-1226 represent intervals in which only PPG signals are collected, while the biological sensing circuitry is in a blanking state. The remaining signals in FIG. 12 substantially resemble the similar signals discussed above in connection with FIG. 1B.

Implantable Medical Device

Figure 13:
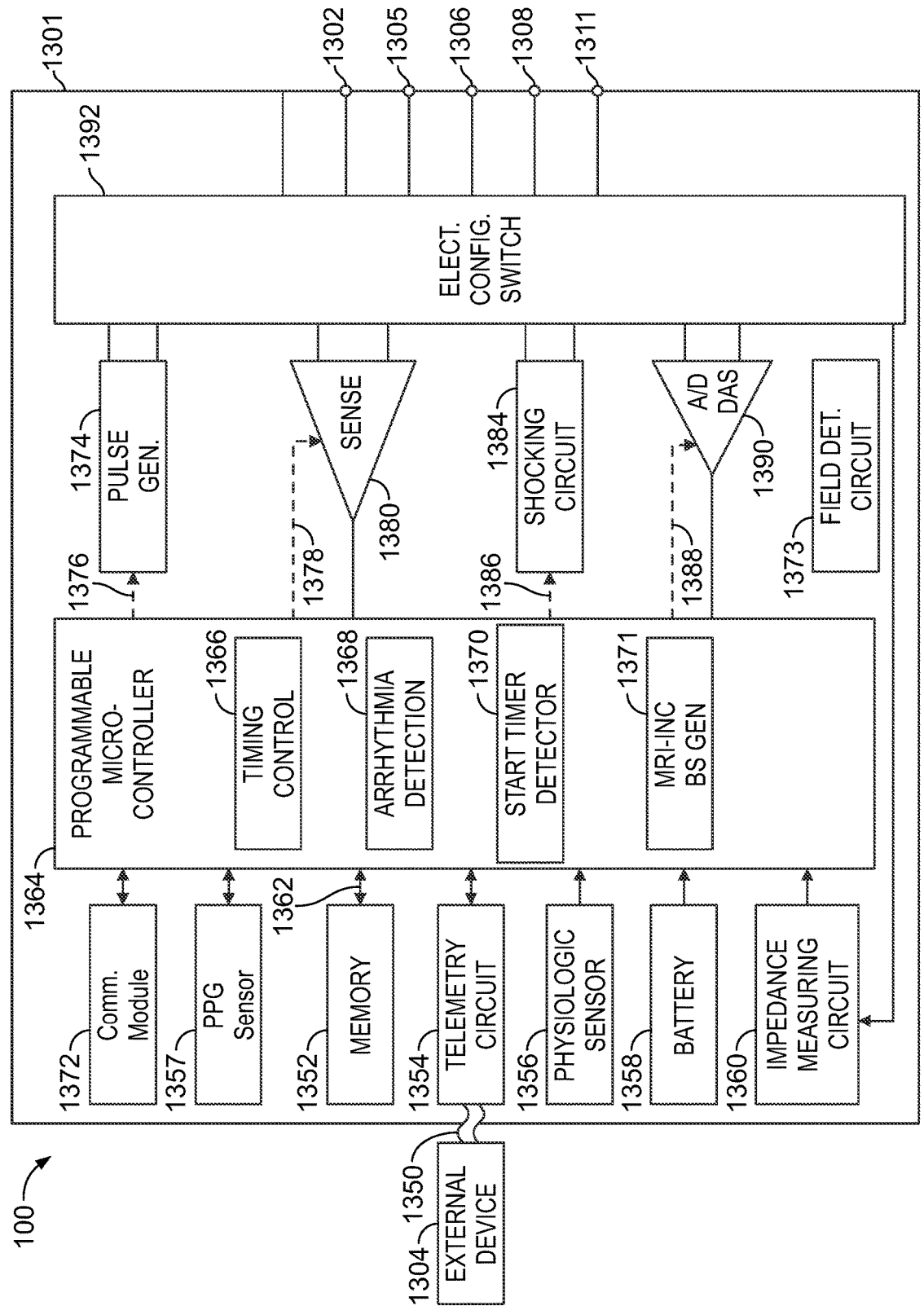
FIG. 13 illustrates a block diagram of the IMD 100 of FIG. 14 in accordance with embodiments herein.

FIG. 13 illustrates a block diagram of the IMD 100 of FIG. 13 in accordance with embodiments herein. The IMD 100 may be implemented as a full-function biventricular pacemaker, equipped with both atrial and ventricular sensing and pacing circuitry for four chamber sensing and stimulation therapy (including both pacing and shock treatment). Optionally, the IMD 100 may provide full-function cardiac resynchronization therapy. Alternatively, the IMD 100 may be implemented with a reduced set of functions and components. For instance, the IMD may be implemented without ventricular sensing and pacing.

The IMD 100 has a device housing 1301 to hold the electronic/computing components. The device housing 1301 (which is often referred to as the "can", "case", "encasing", or "case electrode") may be programmably selected to act as the return electrode for certain stimulus modes. The device housing 1301 further includes a connector (not shown) with a plurality of terminals 1302, 1305, 1306, 1308, and 1311. The terminals may be connected to electrodes that are located in various locations within and about the heart. The type and location of each electrode may vary. For example, the electrodes may include various combinations of ring, tip, coil and shocking electrodes and the like. One or more electrodes or other electrical sensors are coupled to the sensing circuitry 1380 and configured to measure signals indicative of at least one of a cardiac activity characteristic or hemodynamic characteristic or, in accordance with alternative types of IMDs measure a body generated analyte. The biological signals including at least one of cardiac activity signals, cardiac impedance, pulmonary impedance, transthoracic impedances, accelerometer signatures, heart sounds, pulmonary arterial pressure signals, blood pressure, mechanical circulatory support (MCS) rpm levels, or MCS flow rates.

The IMD 100 includes a programmable microcontroller 1364 configured to control various operations of the IMD 100, including cardiac monitoring and stimulation therapy. Microcontroller 1364 includes one or more microprocessors or CPUs (or equivalent control circuitry), RAM and/or ROM memory, logic and timing circuitry, state machine circuitry, and I/O circuitry. The memory is configured to store program instructions executable by the microcontroller 1364 to perform the operations described herein, as well as the overall sensing, analyzing and therapy delivery functionality.

The IMD 100 further includes a pulse generator 1374 that generates stimulation pulses for delivery by one or more electrodes coupled thereto. The pulse generator 1374 may deliver pacing pulses, anti-tachy pacing therapy and the like. The pulse generator 1374 is controlled by the microcontroller 1364 via control signal 1376. The pulse generator 1374 is coupled to the select electrode(s) via an electrode configuration switch 1392, which includes multiple switches for connecting the desired electrodes to the appropriate I/O circuits, thereby facilitating electrode programmability.

The microcontroller 1364 is illustrated to include timing control circuitry 1366 to control the timing of the stimulation pulses (e.g., pacing rate, atrio-ventricular (AV) delay, atrial interconduction (A-A) delay, or ventricular interconduction (V-V) delay, etc.). The timing control circuitry 1366 may also be used for the timing of refractory periods, blanking intervals, noise detection windows, evoked response windows, alert intervals, marker channel timing, and so on. The timing control circuitry 1366 may also be utilized to control the blanking intervals applied to the sensing circuitry 1380 during active field intervals of RF and/or gradient fields. Microcontroller 1364 also has an arrhythmia detector 1368 for detecting arrhythmia conditions, and to review and analyze one or more features of the morphology of cardiac signals. Although not shown, the microcontroller 1364 may further include other dedicated circuitry and/or firmware/software components that assist in monitoring various conditions of the patient's heart and managing pacing therapies.

The microcontroller 1364 includes a start time detector 1370 and an MRI-INC biological signal (BS) generator 1371. The start time detector 1370 is configured to determine start times for the active field intervals when the at least one of RF or gradient fields switch to the active state. The microcontroller 1364 is further configured to identify segments of the biological signals temporally aligned with the active field intervals, the segments including MRI induced interference.

The MRI-INC BS generator 1371 is configured to manage generation of MRI-induced-noise corrected (MRI-INC) biological signals, based on the start times for the active field intervals, by at least one of: 1) applying a blanking interval to the sensing circuitry to blank a sensing operation during at least leading transition portions of the active field interval; or 2) modifying segments of the biological signal sensed during at least the leading transition portions of the active field interval. For example, in accordance with some embodiments, when the biological signals correspond to EGM signals, the N-EGM signals are processed to form the NC-EGM signals. For example, the noise may be removed from the EGM signals and/or the noisy EGM segment may be blanked.

The arrhythmia detector 1368 is configured to analyze the biological signals for an indication that the patient is experiencing the non-physiologic condition.

The operating parameters of the IMD 100 may be non-invasively programmed into the memory 1352 through a telemetry circuit 1354 in telemetric communication via communication link 1350 with the external device 1304. The telemetry circuit 1354 uses high frequency modulation, for example using RF, Bluetooth, or Bluetooth Low Energy telemetry protocols. The telemetry circuit 1354 allows intracardiac electrograms and status information relating to the operation of the IMD 100 (as contained in the microcontroller 1364 or memory 1352) to be sent to the external device 1304 through the established communication link 1350.

The IMD 100 is equipped with a communication module (modulator/demodulator) 1372 to enable wireless communication with other devices, implanted devices and/or external devices. The signals are transmitted in a high frequency range and will travel through the body tissue in fluids without stimulating the heart or being felt by the patient. The communication module 1372 may be implemented in hardware as part of the microcontroller 1364, or as software/firmware instructions programmed into and executed by the microcontroller 1364. Alternatively, the communication modem 1372 may reside separately from the microcontroller as a standalone component. The communication modem 1372 facilitates data retrieval from a remote monitoring network. The communication modem 1372 enables timely and accurate data transfer directly from the patient to an electronic device utilized by a physician.

The transceiver of the telemetry circuit 1354 and/or of the communications module 1372 is configured to transmit at least one of the MRI-INC biological signals (e.g. NC-EGM signals) or the biological signals with MRI induced noise (e.g., N-EGM signals) therein to another implanted device and/or the external device 1304. When the analysis, by the arrhythmia detector 1368, determines a presence of the non-physiologic condition, the transceiver is configured to transmit an instruction to the MRI scanner to halt the MRI scanning sequence. Additionally or alternatively, the microcontroller 1364 is further configured to determine when the transceiver can maintain a communication session with the external device during the MRI scanning sequence. Additionally or alternatively, the microcontroller 1364 is configured to manage generation of the MRI-INC biological signal by at least one of filtering the biological signal or subtracting a noise template from the biological signal, the noise template indicative of MRI induced noise. Additionally or alternatively, the microcontroller 1364 is configured to modify the segment of the biological signal corresponding to at least one of leading or trailing transition portions of the active field interval.

Optionally, the transceiver, of the telemetry circuit 1354 and/or of the communications module 1372, is configured to receive wirelessly a MRI sequence information from the external device. The MRI sequence information includes the start times for the active field intervals. The microcontroller 1364 is configured to utilize the MRI sequence information to at least one of apply the blanking interval or modify the segments of the biological signal occurring during the start times for the active field intervals. Optionally, the transceiver, of the telemetry circuit 1354 and/or of the communications module 1372, is configured to receive a series of active field notifications before the corresponding active field intervals. In connection there with, the microcontroller 1364 is configured to determine the start times based on the active field notifications.

Additionally or alternatively in response to a determination (by the arrhythmia detector 1368) that the patient is experiencing the non-physiologic condition, the microcontroller 1364 is further configured to synchronize MRI data acquisition with collection of biological signals by the IMD by: directing the transceiver to transmit, to the external device, a request for an MRI scanner to pause or halt the MRI procedure; collecting additional biological signals, during an interrupt interval, while the MRI procedure is paused or halted such that the additional biological signals do not include MRI induced interference; and analyzing the additional biological signals for a confirmation or denial that the patient is experiencing the non-physiologic condition.

The IMD 100 further includes a field detector circuit 1373 that is configured to directly detect a leading transition portion of the active field interval from at least one of the RF or gradient fields. For example, the field detector circuit 1373 may be constructed as described in the co-pending application Ser. No. 17/670,005 Titled "SYSTEM FOR DETECTING MAGNETIC RESONANCE GENERATED GRADIENT FIELD USING AN IMPLANTABLE MEDICAL DEVICE" filed on Feb. 11, 2022. Additionally or alternatively, the field detector circuit 1373 may be constructed as described in U.S. Pat. No. 8,620,446 to Min.

The IMD 100 includes sensing circuitry 1380 selectively coupled to one or more electrodes that is configured to obtain biological signals (e.g., cardiac activity signals, neurological activity signals, and the like) indicative of a physiologic or non-physiologic condition of interest over a period of time. For example, the sensing circuitry 1380 performs sensing operations through the switch 1392 to detect the presence of cardiac activity in the right chambers of the heart. The sensing circuitry 1380 may include dedicated sense amplifiers, multiplexed amplifiers, or shared amplifiers. It may further employ one or more low power, precision amplifiers with programmable gain and/or automatic gain control, bandpass filtering, and threshold detection circuit to selectively sense the cardiac signal of interest. The output of the sensing circuitry 1380 is connected to the microcontroller 1364 which, in turn, triggers or inhibits the pulse generator 1374 in response to the absence or presence of cardiac activity. The sensing circuitry 1380 receives a control signal 1378 from the microcontroller 1364 for purposes of controlling the gain, threshold, polarization charge removal circuitry (not shown), and the timing of any blocking circuitry (not shown) coupled to the inputs of the sensing circuitry.

The IMD 100 further includes an analog-to-digital (A/D) data acquisition system (DAS) 1390 coupled to one or more electrodes via the switch 1392 to sample cardiac signals across any pair of desired electrodes. The data acquisition system 1390 is configured to acquire intracardiac electrogram signals, convert the raw analog data into digital data, and store the digital data for later processing and/or telemetric transmission to an external device 1304 (e.g., a programmer, local transceiver, or a diagnostic system analyzer). The data acquisition system 1390 is controlled by a control signal 1388 from the microcontroller 1364.

The microcontroller 1364 is coupled to a memory 1352 by a suitable data/address bus 1362. The programmable operating parameters used by the microcontroller 1364 are stored in memory 1352 and used to customize the operation of the IMD 100 to suit the needs of a particular patient. Such operating parameters define, for example, pacing pulse amplitude, pulse duration, electrode polarity, rate, sensitivity, automatic features, arrhythmia detection criteria, and the amplitude, waveshape and vector of each shocking pulse to be delivered to the patient's heart within each respective tier of therapy.

The IMD 100 may further include one or more physiologic sensors 1356. Such sensors are commonly referred to as "rate-responsive" sensors because they are typically used to adjust pacing stimulation rates according to the exercise state of the patient. However, the physiological sensor 1356 may further be used to detect changes in cardiac output, changes in the physiological condition of the heart, or diurnal changes in activity (e.g., detecting sleep and wake states). Signals generated by the physiological sensors 1356 are passed to the microcontroller 1364 for analysis. The microcontroller 1364 responds by adjusting the various pacing parameters (such as rate, AV Delay, V-V Delay, etc.) at which the atrial and ventricular pacing pulses are administered. While shown as being included within the unit 100, the physiologic sensor(s) 1356 may be external to the unit 100, yet still be implanted within or carried by the patient. Examples of physiologic sensors might include sensors that, for example, sense respiration rate, pH of blood, ventricular gradient, activity, position/posture, minute ventilation (MV), and so forth.

A PPG sensor and PPG sensing circuitry 1357 may be provided to collect PPG signals analyzed in accordance with embodiments herein. The microcontroller 1364, when executing the program instructions, is configured to analyze the PPG signals for an indication that the patient is experiencing the non-physiologic condition. The microcontroller 1364 is further configured to: select between first and second sensing modes based on when a communication session can be maintained during the MRI scanning sequence with the external device. When in the first sensing mode, the microcontroller 1364 turns on the sensing circuitry to sense the biological signals and the PPG sensor to sense PPG signals both during the MRI scanning sequence. When in the second sensing mode, the microcontroller 1364 turns off the sensing circuitry to prevent sensing of the biological signals during the MRI scanning sequence and turn on the PPG sensors to sense PPG signals during the MRI scanning sequence. The microcontroller 1364 analyzes at least one of the biological signals or PPG signals for the indication that the patient is experiencing the non-physiologic condition.

Additionally or alternatively, the microcontroller 1364, when operating in the second sensing mode, is further configured to: direct the transceiver to transmit, to the external device, a request to pause or halt the MRI procedure; collect biological signals, during an interrupt interval, while the MRI procedure is paused or halted such that the biological signals do not include MRI induced interference; and analyze the biological signals for a confirmation or denial that the patient is experiencing the non-physiologic condition. Additionally or alternatively, when in the first sensing mode, the microcontroller 1364 is further configured to: determine start times for active field intervals when the at least one of RF or gradient fields switch to the active state; manage generation of MRI-induced-noise corrected (MRI-INC) biological signals, based on the start times for the active field intervals, by at least one of: 1) applying a blanking interval to the sensing circuitry to blank a sensing operation during at least leading transition portions of the active field interval; or 2) modifying segments of the biological signal sensed during at least the leading transition portions of the active field interval; and analyze the biological signals for an indication that the patient is experiencing the non-physiologic condition.

A battery 1358 provides operating power to all of the components in the IMD 100. The battery 1358 is capable of operating at low current drains for long periods of time, and is capable of providing high-current pulses (for capacitor charging) when the patient requires a shock pulse (e.g., in excess of 2 A, at voltages above 2 V, for periods of 140 seconds or more). The battery 1358 also desirably has a predictable discharge characteristic so that elective replacement time can be detected. As one example, the unit 100 employs lithium/silver vanadium oxide batteries.

Optionally, the IMD 100 further includes an impedance measuring circuit 1360, which can be used for many things, including: lead impedance surveillance during the acute and chronic phases for proper lead positioning or dislodgement; detecting operable electrodes and automatically switching to an operable pair if dislodgement occurs; measuring respiration or minute ventilation; measuring thoracic impedance for determining shock thresholds; detecting when the device has been implanted; measuring stroke volume; and detecting the opening of heart valves; and so forth. The impedance measuring circuit 1360 is coupled to the switch 1392 so that any desired electrode may be used. Optionally, the microcontroller 1364 further controls a shocking circuit 1384 by way of a control signal 1386. The shocking circuit 1384 generates shocking pulses of low (e.g., up to 0.5 joules), moderate (e.g., 0.5-10 joules), or high energy (e.g., 1311 to 40 joules), as controlled by the microcontroller 1364.

The IMD 100 may be operated as an implantable cardioverter/defibrillator (ICD) device, which detects the occurrence of an arrhythmia and automatically applies an appropriate electrical shock therapy to the heart aimed at terminating the detected arrhythmia. To this end, the microcontroller 1364 further controls a shocking circuit 1384 by way of a control signal 1386. The shocking circuit 1380 generates shocking pulses of low (e.g., up to 0.5 joules), moderate (e.g., 0.5-10 joules), or high energy (e.g., 11 to 40 joules), as controlled by the microcontroller 1364. Such shocking pulses are applied to the patient's heart through shocking electrodes. It is noted that the shock therapy circuitry is optional and may not be implemented in the IMD, as the various slave pacing units described below will typically not be configured to deliver high voltage shock pulses. On the other hand, it should be recognized that the slave pacing unit can be used within a system that includes backup shock capabilities, and hence such shock therapy circuitry may be included in the IMD 100.

It is recognized that the configurations of circuitry and microcontrollers illustrated herein are by way of example only. Optionally, operations described in connection with the microcontroller may be implemented by circuitry (e.g., firmware and/or discrete circuitry). Optionally, operations described in connection with the circuitry (e.g., firmware and/or discrete circuitry) may be implemented by the microcontroller.

IMDs and Processes for Inclusion with Alternative Embodiments

Embodiments may be implemented in connection with one or more implantable medical devices (IMDs). Non-limiting examples of IMDs include one or more of neurostimulator devices, implantable leadless monitoring and/or therapy devices, and/or alternative implantable medical devices. For example, the IMD may represent a cardiac monitoring device, pacemaker, cardioverter, cardiac rhythm management device, defibrillator, neurostimulator, leadless monitoring device, leadless pacemaker and the like. The IMD may measure electrical and/or mechanical information. For example, the IMD may include one or more structural and/or functional aspects of the device(s) described in U.S. Pat. No. 9,333,351, entitled "NEUROSTIMULATION METHOD AND SYSTEM TO TREAT APNEA" issued May 10, 2016 and U.S. Pat. No. 9,044,610, entitled "SYSTEM AND METHODS FOR PROVIDING A DISTRIBUTED VIRTUAL STIMULATION CATHODE FOR USE WITH AN IMPLANTABLE NEUROSTIMULATION SYSTEM" issued Jun. 2, 2015, which are hereby incorporated by reference. The IMD may monitor transthoracic impedance, such as implemented by the CorVue algorithm offered by St. Jude Medical. Additionally or alternatively, the IMD may include one or more structural and/or functional aspects of the device(s) described in U.S. Pat. No. 9,216,285, entitled "LEADLESS IMPLANTABLE MEDICAL DEVICE HAVING REMOVABLE AND FIXED COMPONENTS" issued Dec. 22, 2015 and U.S. Pat. No. 8,831,747, entitled "LEADLESS NEUROSTIMULATION DEVICE AND METHOD INCLUDING THE SAME" issued Sep. 9, 2014, which are hereby incorporated by reference. Additionally or alternatively, the IMD may include one or more structural and/or functional aspects of the device(s) described in U.S. Pat. No. 8,391,980, entitled "METHOD AND SYSTEM FOR IDENTIFYING A POTENTIAL LEAD FAILURE IN AN IMPLANTABLE MEDICAL DEVICE" issued Mar. 5, 2013 and U.S. Pat. No. 9,232,485, entitled "SYSTEM AND METHOD FOR SELECTIVELY COMMUNICATING WITH AN IMPLANTABLE MEDICAL DEVICE" issued Jan. 5, 2016, which are hereby incorporated by reference. Additionally or alternatively, the IMD may be a subcutaneous IMD that includes one or more structural and/or functional aspects of the device(s) described in U.S. application Ser. No. 15/973,195, entitled "SUBCUTANEOUS IMPLANTATION MEDICAL DEVICE WITH MULTIPLE PARASTERNAL- ANTERIOR ELECTRODES" filed May 7, 2018; U.S. application Ser. No. 15/973,219, entitled "IMPLANTABLE MEDICAL SYSTEMS AND METHODS INCLUDING PULSE GENERATORS AND LEADS" filed May 7, 2018; U.S. application Ser. No. 15/973,249, entitled "SINGLE SITE IMPLANTATION METHODS FOR MEDICAL DEVICES HAVING MULTIPLE LEADS", filed May 7, 2018, which are hereby incorporated by reference in their entireties. Further, one or more combinations of IMDs may be utilized from the above incorporated patents and applications in accordance with embodiments herein. Embodiments may be implemented in connection with one or more subcutaneous implantable medical devices (S-IMDs). For example, the S-IMD may include one or more structural and/or functional aspects of the device(s) described in U.S. application Ser. No. 15/973,219, entitled "IMPLANTABLE MEDICAL SYSTEMS AND METHODS INCLUDING PULSE GENERATORS AND LEADS", filed May 7, 2018; U.S. application Ser. No. 15/973,195, entitled "SUBCUTANEOUS IMPLANTATION MEDICAL DEVICE WITH MULTIPLE PARASTERNAL-ANTERIOR ELECTRODES", filed May 7, 2018; which are hereby incorporated by reference in their entireties. The IMD may represent a passive device that utilizes an external power source, and entirely mechanical plan will device, and/or an active device that includes an internal power source. The IMD may deliver some type of therapy/treatment, provide mechanical circulatory support and/or merely monitor one or more physiologic characteristics of interest (e.g., PAP, CA signals, impedance, heart sounds).

Embodiments herein may be incorporated with the structure and functionality (e.g. detection and analysis of the corresponding types of biological signals and determinations of the corresponding types of non-physiologic conditions) described in any or all of the publications referenced herein, including the following: U.S. patent application Ser. No. 16/930,791, filed Jul. 16, 2020, and titled "METHODS, DEVICES AND SYSTEMS FOR HOLISTIC INTEGRATED HEALTHCARE PATIENT MANAGEMENT"; U.S. Patent Publication Number 2014/0275827, entitled "METHOD AND SYSTEM FOR DERIVING EFFECTIVENESS OF MEDICAL TREATMENT OF A PATIENT" published Sep. 18, 2014; U.S. Patent Publication Number 2014/0039238, entitled "SYSTEMS AND METHODS FOR CONTROLLING NEUROSTIMULATION OF ACUPUNCTURE SITES USING AN IMPLANTABLE CARDIAC RHYTHM MANAGEMENT DEVICE" published Feb. 6, 2014; U.S. Patent Publication Number 2013/0204147, entitled "ATRIAL FIBRILLATION DETECTION BASED ON PULMONARY ARTERY PRESSURE DATA" published Aug. 8, 2013; U.S. Patent Publication Number 2013/0116583, entitled "SYSTEMS AND METHODS FOR PREDICTING AND CORROBORATING PULMONARY FLUID OVERLOADS USING AN IMPLANTABLE MEDICAL DEVICE" published May 9, 2013; U.S. Patent Publication Number 2012/0089032, entitled "METHOD AND SYSTEM FOR DISCRIMINATING AND MONITORING ATRIAL ARRHYTHMIA BASED ON CARDIOGENIC IMPEDANCE" published Apr. 12, 2012; U.S. patent application Ser. No. 11/378,604, filed Mar. 16, 2006, of Kroll et al., entitled, "System and Method for Detecting Arterial Blood Pressure based on Aortic Electrical Resistance using an Implantable Medical Device," now U.S. Pat. No. 7,654,964; U.S. Patent Publication Number 2011/0125206, entitled "SINGLE CHAMBER IMPLANTABLE MEDICAL DEVICE FOR CONFIRMING ARRHYTHMIA THROUGH RETROSPECTIVE CARDIAC SIGNALS" published May 26, 2011; U.S. Patent Publication Number 2014/0221771, entitled "METHOD AND IMPLANTABLE SYSTEM FOR BLOOD-GLUCOSE CONCENTRATION MONITORING USING PARALLEL METHODOLOGIES" published Aug. 7, 2014; U.S. Patent Publication Number 2014/0058278, entitled "SYSTEMS AND METHODS FOR DETECTING ISCHEMIC EVENTS" published Feb. 27, 2014; U.S. Patent Publication Number 2013/0218036, entitled "METHODS AND SYSTEMS TO CORRELATE ARRHYTHMIC AND ISCHEMIC EVENTS" published Aug. 22, 2013; U.S. Patent Publication Number 2012/0197149, entitled "SYSTEM AND METHOD FOR DISTINGUISHING AMONG CARDIAC ISCHEMIA, HYPOGLYCEMIA AND HYPERGLYCEMIA USING AN IMPLANTABLE MEDICAL DEVICE" published Aug. 2, 2012; U.S. Patent Publication Number 2012/0065527, entitled "METHODS AND SYSTEMS FOR MONITORING ATRIAL STIFFNESS" published Mar. 15, 2012; U.S. Patent Publication Number 2012/0046528, entitled "SYSTEM AND METHOD FOR DETECTING AND TREATING CARDIOVASCULAR DISEASE" published Feb. 23, 2012; U.S. Patent Publication Number 2011/0004111, entitled "ISCHEMIA DETECTION USING INTRA-CARDIAC SIGNALS" published Jan. 6, 2011; U.S. Pat. No. 8,514,086, entitled "DISPLAYS FOR A MEDICAL DEVICE", issued Aug. 20, 2013; U.S. Patent Publication Number 2011/0256024, entitled "MODULAR ANALYTE MONITORING DEVICE", published Oct. 20, 2011; U.S. Patent Publication Number 2010/0198142, entitled "MULTIFUNCTION ANALYTE TEST DEVICE AND METHODS THEREFORE", published Aug. 5, 2010; U.S. Patent Publication Number 2011/0160544, entitled "SYSTEM AND METHOD FOR ANALYSIS OF MEDICAL DATA TO ENCOURAGE HEALTHCARE MANAGEMENT", published Jun. 30, 2011; U.S. Pat. No. 5,063,081, entitled "METHOD OF MANUFACTURING A PLURALITY OF UNIFORM MICROFABRICATED SENSING DEVICES HAVING AN IMMOBILIZED LIGAND RECEPTOR" issued Nov. 5, 1991; U.S. Pat. No. 7,419,821, entitled "APPARATUS AND METHODS FOR ANALYTE MEASUREMENT AND IMMUNOASSAY" issued Sep. 2, 2008; U.S. Patent Publication Number 2004/0018577, entitled "MULTIPLE HYBRID IMMUNOASSAYS" published Jan. 29, 2004; U.S. Pat. No. 7,682,833, entitled "IMMUNOASSAY DEVICE WITH IMPROVED SAMPLE CLOSURE" issued Mar. 23, 2010; U.S. Pat. No. 7,723,099, entitled "IMMUNOASSAY DEVICE WITH IMMUNO-REFERENCE ELECTRODE" issued May 25, 2010; Baj-Rossi et al. "FABRICATION AND PACKAGING OF A FULLY IMPLANTABLE BIOSENSOR ARRAY", (2013) IEEE, pages 166-169. U.S. Pat. No. 6,786,874, entitled "APPARATUS AND METHOD FOR THE COLLECTION OF INTERSTITIAL FLUIDS" issued Sep. 7, 2004; and U.S. Pat. No. 9,872,641, entitled "METHODS, DEVICES AND SYSTEMS RELATED TO ANALYTE MONITORING" issued Jan. 23, 2018; U.S. patent application Ser. No. 11/387,579, filed Mar. 23, 2006, of Koh, entitled "System and Method for Calibrating a Blood Oxygen Saturation Sensor for use with an Implantable Medical Device," now U.S. Pat. No. 8,099,146; U.S. patent application Ser. No. 11/267,665, filed Nov. 4, 2005, of Kil et al., entitled "System and Method for Measuring Cardiac Output via Thermal Dilution using an Implantable Medical Device with Thermistor Implanted in Right Ventricle," now abandoned; U.S. Patent Publication No. 2005/0215914, to Bornzin et al., entitled "System and Method for Evaluating Heart Failure Based on Ventricular End-Diastolic Volume using an Implantable Medical Device"; U.S. Pat. No. 5,800,467 to Park et al., entitled "Cardio-Synchronous Impedance Measurement System for an Implantable Stimulation Device;" U.S. patent application Ser. No. 11/100,189, filed Apr. 5, 2005, of Koh, entitled "System and Method for Detection of Respiration Patterns via Integration of Intracardiac Electrogram Signals," now U.S. Pat. No. 7,404,799; and in U.S. patent application Ser. No. 11/623,663, filed Jan. 16, 2007, of Zou et al., entitled "Sensor/Lead Systems for use with Implantable Medical Devices," now U.S. Pat. No. 8,388, 670.

All references, including publications, patent applications and patents, cited herein are hereby incorporated by reference to the same extent as if each reference were individually and specifically indicated to be incorporated by reference and were set forth in its entirety herein.

CLOSING STATEMENTS

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof.

The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An implantable medical device (IMD), comprising:
   sensing circuitry coupled to electrodes, the sensing circuitry configured to sense electrical biological signals indicative of a non-physiologic condition experienced by a patient,
   an optical photoplethysmography (PPG) sensor configured to sense PPG signals,
   a transceiver configured to communicate with an external device;
   memory to store the biological signals and to store program instructions; and
   a processor that, when executing the program instructions, is configured to:
   determine when a communication session can be opened and maintained between the IMD and the external device during a magnetic resonance imaging (MRI) procedure and in the presence of an MRI scanning sequence, wherein over a course of the MRI scanning sequence at least one of radio frequency (RF) or gradient fields are in an active state for active field intervals;
   select between first and second sensing modes based on the determination, wherein the first sensing mode is selected when the communication session can be opened and maintained during the MRI procedure and in the presence of the MRI scanning sequence, and wherein the second sensing mode is selected otherwise;
   when in the first sensing mode, turn on the sensing circuitry to sense the electrical biological signals and turn on the PPG sensor to sense the PPG signals both during the MRI scanning sequence; and
   when in the second sensing mode, turn off the sensing circuitry to prevent sensing of the electrical biological signals during the MRI scanning sequence and turn on the PPG sensors to sense the PPG signals during the MRI scanning sequence.

2. The IMD of claim 1, wherein the processor, when executing the program instructions, is configured to analyze the PPG signals for an indication that the patient is experiencing a normal or abnormal hemodynamic state.

3. The IMD of claim 1, wherein the processor, when executing the program instructions, is configured to analyze the PPG signals to detect a cardiac event of interest.

4. The IMD of claim 3, wherein, when the cardiac event of interest exceeds a threshold, the processor is further configured to perform a therapy monitoring operation to collect at least one of additional PPG signals or additional electrical biological signals for analysis to verify an arrhythmia.

5. The IMD of claim 1, wherein, when operating in the second sensing mode, the processor is further configured to:
   direct the transceiver to transmit, to the external device, a request to pause or halt the MRI procedure;
   collect additional electrical biological signals, during an interrupt interval, while the MRI procedure is paused or halted such that the additional electrical biological signals do not include MRI induced interference.

6. The IMD of claim 1, wherein, when in the first sensing mode, the processor is further configured to:
   determine start times for active field intervals when the at least one of RF or gradient fields switch to the active state; and
   manage generation of MRI-induced-noise corrected (MRI-INC) biological signals, based on the start times for the active field intervals, by at least one of:
   1) Applying a blanking interval to the sensing circuitry to blank a sensing operation during at least leading transition portions of the active field interval; or
   2) Modifying segments of the electrical biological signal sensed during at least the leading transition portions of the active field interval.

7. The IMD of claim 6, further comprising a field detector circuit configured to directly detect the active field interval for at least one of the RF or gradient fields.

8. The IMD of claim 1, wherein the electrical biological signals represent cardiac activity signals and the processor, when executing the program instructions, is configured to analyze the electrical biological signals to detect an arrhythmia.

9. The IMD of claim 1, wherein the sensing circuitry is configured to measure signals indicative of at least one of a cardiac activity characteristic or neurological characteristic, the electrical biological signals including at least one of cardiac activity signals, cardiac impedance, pulmonary impedance, or transthoracic impedances.

10. A method for managing one or more implantable medical devices (IMDs), the method comprising
    utilizing sensing circuitry of the one or more IMDs to sense electrical biological signals indicative of a non-physiologic condition experienced by a patient;
    utilizing an optical photoplethysmography (PPG) sensor of the one or more IMDs to sense PPG signals,
    determining when a communication session can be opened and maintained between the one or more IMDs and an external device during a magnetic resonance imaging (MRI) procedure and in the presence of an MRI scanning sequence, wherein over a course of the MRI scanning sequence at least one of radio frequency (RF) or gradient fields are in an active state for active field intervals;
    selecting between first and second sensing modes for the one or more IMDs based on the determination, wherein the first sensing mode is selected when the communication session can be opened and maintained during the MRI procedure and in the presence of the MRI scanning sequence, wherein the second sensing mode is selected otherwise;

when in the first sensing mode, turning on the sensing circuitry to sense the electrical biological signals and turning on the PPG sensor to sense PPG signals both during the MRI scanning sequence; and when in the second sensing mode, turning off the sensing circuitry to prevent sensing of the electrical biological signals during the MRI scanning sequence and turning on the PPG sensors to sense PPG signals during the MRI scanning sequence.

11. The method of claim 10, further comprising analyzing the PPG signals for an indication that the patient is experiencing a normal or abnormal hemodynamic state.

12. The method of claim 10, further comprising analyzing the PPG signals to detect a cardiac event of interest.

13. The method of claim 12, wherein, when the cardiac event of interest exceeds a threshold, the method further comprising performing a therapy monitoring operation to collect at least one of additional PPG signals or additional electrical biological signals for analysis to verify an arrhythmia.

14. The method of claim 10, further comprising:
directing a transceiver to transmit, to an external device, a request to pause or halt the MRI procedure;
collecting additional electrical biological signals, during an interrupt interval, while the MRI procedure is paused or halted such that the additional electrical biological signals do not include MRI induced interference; and
directing a transceiver to transmit, to an external device, a request to restart or resume the MRI procedure.

15. The method of claim 10, wherein, when in the first sensing mode, the method further comprising:
determining start times for active field intervals when the at least one of RF or gradient fields switch to the active state; and
managing generation of MRI-induced-noise corrected (MRI-INC) biological signals, based on the start times for the active field intervals, by at least one of:
1) Applying a blanking interval to the sensing circuitry to blank a sensing operation during at least leading transition portions of the active field interval; or
2) Modifying segments of the electrical biological signal sensed during at least the leading transition portions of the active field interval.

* * * * *